US010630666B2

(12) United States Patent
Sharma et al.

(10) Patent No.: US 10,630,666 B2
(45) Date of Patent: Apr. 21, 2020

(54) PEER REGISTRATION AND RELATIONSHIP FULFILLMENT SYSTEM AND METHOD THEREOF

(71) Applicants: Dhiraj Sharma, Roswell, GA (US); Swapnil Sharma, Roswell, GA (US)

(72) Inventors: Dhiraj Sharma, Roswell, GA (US); Swapnil Sharma, Roswell, GA (US)

( * ) Notice: Subject to any disclaimer, the term of this patent is extended or adjusted under 35 U.S.C. 154(b) by 570 days.

(21) Appl. No.: 15/252,814

(22) Filed: Aug. 31, 2016

(65) Prior Publication Data
US 2018/0063109 A1 Mar. 1, 2018

(51) Int. Cl.
| | |
|---|---|
| *H04L 12/58* | (2006.01) |
| *H04L 29/06* | (2006.01) |
| *H04L 29/08* | (2006.01) |
| *H04W 12/06* | (2009.01) |

(52) U.S. Cl.
CPC ........... *H04L 63/08* (2013.01); *H04L 63/102* (2013.01); *H04L 63/104* (2013.01); *H04L 67/02* (2013.01); *H04L 67/04* (2013.01); *H04L 67/125* (2013.01); *H04L 67/20* (2013.01); *H04W 12/06* (2013.01);
(Continued)

(58) Field of Classification Search
CPC ..... H04L 63/104; H04L 67/125; H04L 67/20; H04L 63/102; H04L 67/306; H04L 51/22; H04L 67/42; H04L 63/08; H04L 67/02; H04L 67/04; H04L 29/06; H04L 29/08072; H04W 12/06; G06F 17/30067; G06F 17/30575; G06F 17/30867; G06Q 10/06; G06Q 10/10; G06Q 10/105;
(Continued)

(56) References Cited

U.S. PATENT DOCUMENTS

2007/0030824 A1* 2/2007 Ribaudo ............... G01S 5/0018
370/328
2008/0288774 A1* 11/2008 Mahdavi ........... H04L 29/12066
713/155
(Continued)

OTHER PUBLICATIONS

The PCT International Search Report and Written Opinion released by the U.S. Patent & Trademark Office as International Search Authority dated Nov. 7, 2017; 9 pages.

*Primary Examiner* — Theodore C Parsons
(74) *Attorney, Agent, or Firm* — Smith Gambrell & Russell LLP

(57) ABSTRACT

A method and a system to allow Peers to register with and establish ownership of identities, such as email addresses, social network identities, phone numbers, etc., that they are recognized by in the real world, and then have these be utilized for the purpose of being targeted for relationship establishment. Correspondingly, the Peer uses identities of other Peers to seek relationships with these Peers, who too have registered and established ownership of their identities. Relationships are assessed for compatibility prior to fulfillment. A Relationship request could be made visible to all Peers, to the targeted Peer or to the targeted Peer if the targeted Peer also seeks an equivalent relationship with the Peer. Relationship fulfillment may be customized to allow for prior affirmations. Peers use their various network connected computing devices to utilize the system, which runs on a host of network connected computing devices.

32 Claims, 18 Drawing Sheets

(52) U.S. Cl.
CPC .............. *H04L 51/22* (2013.01); *H04L 51/32* (2013.01); *H04L 67/306* (2013.01); *H04L 67/42* (2013.01)

(58) Field of Classification Search
CPC .............. G06Q 10/1053; G06Q 30/02; G06Q 30/0601; G06Q 30/08; G06Q 50/01; G06Q 99/00
See application file for complete search history.

(56) References Cited

U.S. PATENT DOCUMENTS

| | | | |
|---|---|---|---|
| 2010/0005520 A1* | 1/2010 | Abbot ................... | G06Q 10/10 726/6 |
| 2011/0167059 A1 | 7/2011 | Fallah | |
| 2014/0089412 A1* | 3/2014 | Patvarczki .............. | H04W 4/21 709/204 |
| 2014/0195626 A1* | 7/2014 | Ruff ...................... | H04L 63/104 709/206 |
| 2016/0255139 A1* | 9/2016 | Rathod ................... | H04L 67/22 709/203 |

\* cited by examiner

Fig. 4: Peer Registration and Relationship Fulfillment System Physical Overview

PEER REGISTRATION AND RELATIONSHIP FULFILLMENT SYSTEM AND METHOD THEREOF

BACKGROUND

Field of Invention

This invention is generally in the field of methods and systems to seek and fulfill relationships on-line and more particularly in the specifiable targeting of resources with whom relationships are desired.

Related Art

There are a plethora of internet services available that purport to match individuals with similar backgrounds, interests and other characteristics. Similar services exist in the business and corporate settings too, aspiring to match job applicants with prospective employers. Such services typically rely on the user provided details and an algorithmic component to determine the match.

While such services do provide matches of various qualities, they also add an element of risk and anxiety that often comes with engaging with an entirely new and unfamiliar entity. Anxiety could come from the anticipation of being scrutinized by some one that is hither to unknown. Risks could arise from running into someone who hasn't been properly vetted and turns out to be a sociopath, a con or scam artist, an identity thief, etc. with some intent on creating harm. Additionally people of an introverted nature may arguably be averse to utilizing such services. Similarly, businesses may be exposed to hiring candidates whose resumes look great on paper, but who lack the softer skills such as teamwork and collaboration, effective communication, conflict resolution, time management, creativity, problem solving, working under pressure, etc., required to work efficiently and cohesively in teams, and who have a deficit in, difficult to assess upfront traits like, worth ethic. These considerations would hinder individuals and businesses from utilizing such services, or if they do use these services, take on potentially additional risks associated with establishing relationships with unknown and unfamiliar entities.

In the real world, individuals often desire to seek relationships with other individuals that they have already met and with whom they have established a level of comfort. However, a lack of knowledge and certainty that the other entity harbors the same desire and will reciprocate serves as a barrier to the initiation of such relationships. Avoiding any embarrassing situations, as well as any feeling of hurt that comes from the other entity overtly rejecting a relationship proposal, overrides the desire to establish a relationship, leaving it pent up and unfulfilled. The inertia to pursue a relationship is further compounded when there are routine interactions involved with the other entity, e.g. in a work or school environment, and the perception that harmony would be disrupted by any declined relationship request. In a corporate setting, companies are interested in recruiting talented individuals but in certain situations hold back, e.g. to avoid any poaching considerations, employee referral time limits etc. In another scenario, prospective hires may not seek certain companies in the absence of assurance that they are being actively sought after, especially where the fraternity around an industry is small and may jeopardize their position with their existing employer and place of work. Other situations may involve businesses seeking to establish relationship with other businesses, where revealing their inclination upfront may weaken their position in the relationship, e.g. companies seeking to be bought out by or merge with other companies. As such individuals and businesses in several situations may not seek to establish relationships even with known entities, unless there is some assurance of reciprocity and confidentiality.

Therefore, there is a need for a method and system that allows for entities to seek and establish relationships with known entities, thereby overcoming some of the limitations that exist with the current methods of entity determination for relationship establishment and relationship realization. In addition, there is a need for a system that brings down barriers, whether genuine or perceived, that prevent entities who are already familiar with each other, from progressing to seek and establish relationships with each other. Furthermore, there is a need for a system that allows for the degree of confidentiality and reciprocity to be tuned to desired levels in line with specific needs, to instill confidence and address such concerns. Establishing relationships with known entities also helps avoid risks that come with gambling on unknown entities, who may not have been properly vetted and may be unsuitable.

SUMMARY OF THE INVENTION

A peer registration and relationship fulfillment method and system is presented to allow entities to seek and establish relationships with known entities and thereby overcome some of the limitations that exist with the current methods of entity pairing and relationship realization.

The peer registration and relationship fulfillment method and system involves an entity such as an individual or a business, also referred to as a Peer, registering with the peer registration and relationship fulfillment system with their set of shareable authenticated identities by which the Peer is recognized by in the real world. To seek a relationship with another Peer, the Peer then identifies the other Peer with any of the other Peer's shared identities. Use of identities to specify the Peer with whom a relationship is being sought eliminates the limitation that both Peers already be registered with the system, allowing Peers to seek relationships with other Peers that possibly haven't as yet registered but may do so at some point in the future, either of their volition or through systematic solicitation. Furthermore, use of authenticated identities helps avoid situations where-in either through error or through intent, a Peer could use an unauthenticated identity of which they are not the owner, to seek a relationship and there by mislead the other Peer. Based on the identities specified on the relationship request, the peer registration and relationship fulfillment system in due course can detect that two Peers are seeking relationships with each other. Once two registered Peers are seeking compatible relationships with each other, the system initiates appropriate affirmations and notifications processing with the concerned Peers, thereby carrying out the relationship requests to fulfillment.

There are various significant variants and options to the above process. This summary does not limit the scope of the claimed subject matter. Furthermore, the claimed subject matter is not constrained to the limitations that solve any or all disadvantages noted in any part of this disclosure. Features, aspects and advantages of the present invention are understood with reference to the following description, appended claims and accompanying figures.

DETAILED DESCRIPTION

Figure 1:
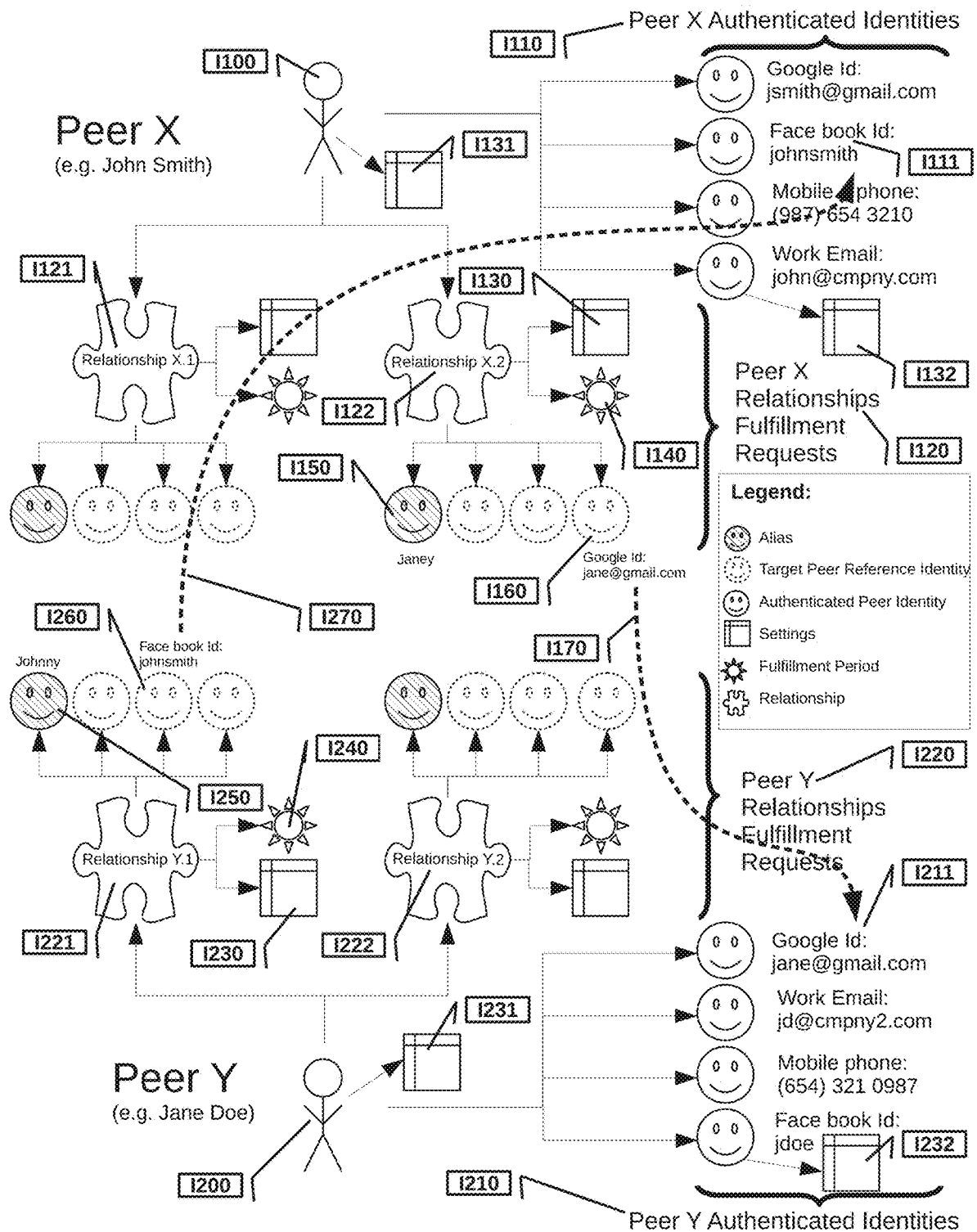
FIG. 1 illustrates a schematic representation of the information architecture of the peer registration and relationship fulfillment system according to an aspect of the present invention.

In the following detailed description of the preferred embodiments, reference is made to the accompanying drawings, which form a part hereof, and within which are shown by way of illustration specific embodiments by which the invention may be practiced. It is understood that other embodiments may be utilized and structural changes may be made without departing from the scope of the invention.

In an aspect, the peer registration and relationship fulfillment (PRRF) method and system of the current invention is directed to overcome some of the limitations that exist with the current methods that are geared towards seeking and establishing relationships with unknown entities. In an aspect, the PRRF method and system is directed to allow entities to explicitly target and establish relationships with known entities. The PRRF method and system provide individuals the ability to directly pursue relationships with entities about whom they have prior knowledge and thereby overcome some of the limitations that exist with the current methods, which attempt to indirectly identify and establish relationships between entities who may not be familiar with each other.

The PRRF system and method involves an entity registering with the PRRF system with an authenticated identity or identities of the entity. An entity can be either an individual or a business and is interchangeably referred to as a Peer to better reflect the entity being a partner in the relationship. These authenticated identities are ones that the Peer is recognized by in the real world and which the Peer routinely shares with other Peers. To seek a relationship with another Peer, a registered Peer submits a relationship request to the PRRF system, which directly targets the other Peer, identifying the other Peer with any of the other Peer's shared identities. Use of identities to specify the Peer with whom a relationship is being sought eliminates any dependency or time based sequencing in which the Peers seeking relationships must register.

There is thus no limitation that both Peers already be registered with the PRRF system to seek relationships with each other, allowing Peers to seek relationships with other Peers that possibly haven't as yet registered but may do so at some point in the future. In an aspect, the PRRF system would recognize that there are unregistered Peers associated with submitted relationship requests and as such could solicit such unregistered Peers to register. Based on the identities specified on the submitted relationship request, the PRRF system in due course can detect that two Peers are seeking relationships with each other. Only identities that a Peer is able authenticate are associated with that Peer. Use of authenticated identities instead of unauthenticated ones, helps prevents situations, where-in either through intent or in error, a Peer could masquerade as another Peer to establish relationships. Upon validating that two registered Peers are seeking compatible relationships with each other, the PRRF system initiates appropriate affirmations and notifications processing with the concerned Peers, thereby carrying out the relationship requests to fulfillment.

Use of identities that are shared routinely also serves to enhance confidentiality while seeking relationships. For example, in an office setting, a Peer interested in seeking a reciprocal relationship from another colleague without wishing to overtly reach out to them, could provide that colleague their cell phone number on some work related pretext. The Peer could then authenticate that cell phone number as one of their identities and associate it with their registration. Sharing the cell phone number identity with the colleague allows the Peer to be targeted by that colleague if the colleague too is interested in seeking a relationship with the Peer by using the Peer provided cell phone number identity. If however, the colleague is uninterested in such a relationship, the Peer did not have to reveal their desire for the relationship.

For a further understanding of an aspect of the invention, designed to facilitate entities seeking relationships, consider an example where an entity decides to seek a relationship with some other entity through the system, and the latter entity also decides to seek a relationship with the former entity. As mentioned earlier, both entities being partners in the relationship are interchangeably referred to as Peers in this document. Thus in the example, a first Peer, referred to as Peer X, decides to seek a relationship with a second Peer, referred to as Peer Y, with Peer Y also deciding to seek a relationship with Peer X. These peers and relationships (i.e., Peers X seeking a relationship with Peer Y and Peer Y seeking a relationship with Peer X) will be used throughout the remainder of this application for example purposes only. It is understood that other types of relationships (e.g., Peer X looking for a relationship with Peer Y but Peer Y not looking for a relationship with Peer X or Peer X looking for a relationship with Peers Y and Z) can be pursued by the system. Therefore, the relationships should not be limited to only Peers X and Y.

FIG. 1 illustrates a possible embodiment of the PRRF system at a high level, depicting the organization of information for the two example Peers: Peer X and Peer Y, with Peers X and Y seeking a relationship with each other. FIG. 1 provides details of the information organization of the two entities and will be utilized to explain some facets of the invention.

FIG. 1 depicts a Peer X I100 with a name of John Smith that has registered with the PRRF system. As discussed above, the PRRF system can be configured to require Peers to register. In an aspect, the registration requires that the Peer provide a name (e.g., John Smith), any Peer level settings I131, as well as identities, including those that are authenticated and not authenticated. In an aspect, the PRRF system will typically call upon a third party to authenticate the identities that were provided by that third party. For example for a gmail identifier of Google's email service, the system can call upon Google to authenticate the gmail identifier. Note that it is possible for the PRRF system itself to become an identity provider, however initially it is less likely that such PRRF system provided identities would be routinely shareable by the Peers. Any PRRF system provided identity would be authenticated by the PRRF system itself. In addition, the authentication of the identities of a Peer does not have to occur all at once. For example, a Peer can acquire additional identities (e.g., phone number) over time after he or she has registered. In addition, some identities when provided might not be able to be authenticated at the time provided, but can be authenticated at a later date and time (e.g., a new social media platform that was suffering an outage when the Peer was registering or one that doesn't yet provide full integration). I110 specifies all of Peer X's authenticated identities which are currently: a Google Id 'jsmith@gmail.com'; a Facebook Id I111 of 'johnsmith'; Mobile phone number (987) 654 3210; a work email address of 'john@cmpny.com' which has optional Identity settings of I132. All of these identities have been validated to be owned by the Peer that registered as John Smith.

In an aspect, once a Peer has become registered and supplied authenticated identities, the Peer can then begin to pursue relationships with other peers who are referred to as Target Peers of the relationship. For example, Peer X is currently seeking two relationships I120, namely I121 Relationship X.1 and I122 Relationship X.2. Peer X being the originator of both relationship requests is referred to as the Source Peer for both relationships Relationship X.1 and Relationship X.2. The Peer pursues the relationships by submitting a request for a relationship. In an aspect, the Source Peer can specify certain attributes for each request for a relationship: an alias name for the relationship; identities referencing the Target Peer with whom the relationship is desired; time periods during which the relationship request is active; additional settings around how the relationship request should be fulfilled. For Relationship X.2 request I122 Peer X is seeking a relationship request with a Target peer Jane Doe for which the following attributes have been provided: a Peer X created alias I150 for the relationship, of 'Janey'; 3 identities referencing Jane Doe that Peer X knows Jane Doe by, of which one of them is I160, a Google Id of 'jane@gmail.com'; some relationship fulfillment settings I130; and time periods I140 during which the relationship request is active.

I200 in FIG. 1 shows Peer Y with a name of Jane Doe that has registered with the PRRF system and also providing Peer level settings I231. I210 specifies all of Peer Y's authenticated identities which are currently: a Google Id I211 of 'jane@gmail.com'; a Facebook Id 'jdoe' with optional Identity settings of I232; Mobile phone number (654) 321 0987; a work email address of 'jd@cmpny2.com'. All of these identities have been validated to be owned by the Peer that registered as Jane Doe. Peer Y furthermore is also currently seeking two relationships I220, namely I221 Relationship Y.1 and I222 Relationship Y.2. Peer Y is the Source Peer for both relationships Relationship Y.1 and Relationship Y.2. For Relationship Y.1 request I221, Peer Y is seeking a relationship request with a Target Peer John Smith for which the following attributes have been provided: a Peer Y created alias I250 for the relationship, of 'Johnny'; 3 identities referencing John Smith that Peer Y knows John Smith by, of which one of them is I260, a Facebook Id of 'johnsmith'; some relationship fulfillment settings I230; and time periods I240 during which the relationship request is active.

Once relationship requests have been submitted, based upon the requirements of the requests, relationships can be fulfilled. For example, FIG. 1 shows how relationships are fulfilled according to an aspect. As Peer X seeks relationship Relation X.2 I122 with Target Peer Y, Peer X has provided several Target Peer Reference Identities by which Peer X knows Peer Y, including identity I160, a Google Id of 'jane@gmail.com'. Peer Y has registered and authenticated several of her identities I210, one of which is the identity of the Google Id 'jane@gmail.com' I211.

To fulfill a relationship, the PRRF system searches for any registered Peers with an authenticated identity that is the same as that specified by the Target Peer Reference Identity in a relationship request. Any Peer so found would be the Target Peer of the relationship request. In this example, Peer Y I200 has an authenticated identity I211 'jane@gmail.com' that is the same as the Target Peer Reference Identity I160 of Relationship X.2 I122, which is also 'jane@gmail.com'. Finding the Target Peer I200 of a relationship's Target Peer Reference Identity I160 allows for the linkage I170 between the Peers. That is, with the link I170 the independent registration of Peer X I100 and its relationship request Relationship X.2 I122 has now been directly associated with another separate and independent registrant of the PRRF system Peer Y I200. Establishment of the link I170 logically denotes that Peer X is interested in a relationship with Peer Y and not the other way around. Similarly, as Peer Y seeks a Relationship Y.1 I221 with Peer X, Peer Y has provided several Target Peer Reference identities with which they know Peer X by, one of which is identity I260: a Facebook Id of 'johnsmith'. Peer X has registered and authenticated several of his identities I110, one of which is the identity of the Facebook Id of 'johnsmith' I111. Again, Peer Y requesting for a relationship with a Peer using that Peer's identity I260 allows the PRRF system to find the Target Peer, Peer X, with the same authenticated owned identity I111, there by establishing the linkage I270 between the independently registering Peers. Linkage I270 denotes that Peer Y is seeking relationship I221 with a Target Peer of Peer X while the earlier discussed linkage I170 denotes that Peer X is seeking relationship I122 with a Target Peer of Peer Y. That is, both Peer X and Peer Y are interested in establishing some form of relationship with each other. An innovation under this invention is the use of identities to allow a Source Peer to seek relationships with a specific Target Peer using the Target Peer's known identities, where the Target Peer may not have registered as yet or the Target Peer may not have authenticated as yet the identity being used by the Source Peer to seek the relationship with that Target Peer.

In this document, a relationship request that is being processed for fulfillment is often referred to as The Relationship (TR). Furthermore, if the TR's Target Peer has a relationship request where that relationship request's Target Peer is the Source Peer of the TR, then that relationship request is referred to in this document as the Target Peer Relationship (TPR) of TR. That is, if TR is a relationship request from a Peer targeting another Peer, then the TPR is the reciprocal relationship request from the other Peer targeting back to that Peer. Using the example depicted in FIG. 1, if TR I122 is being processed for fulfillment, then the TR has a Source Peer I100 (by virtue of Peer I100 being the submitter of relationship request I122) and a Target Peer I200 (by virtue of one of relationship request I122's Target Peer Reference Identities I160 being claimed by registered Peer I200 as one of their Authenticated Identities I211). Additionally, Peer I200 has a relationship request I221 with a Source Peer I200 (by virtue of Peer I200 being the submitter of relationship request I221) and a Target Peer of I100 (by virtue of one of relationship request I221's Target Peer Reference Identity I260 being claimed by registered Peer I100 as one of their Authenticated Identities I111). This makes relationship request I221 the TPR of TR I122. Thus TR I122 is a relationship request from Peer I100 targeting Peer I200, with the TPR I221 being the reciprocal relationship request from Peer I200 targeting Peer I100.

While covering the Information Architecture in FIG. 1, a single relationship was discussed as being one involving two Peers, a Source Peer and a Target Peer. However it should be mentioned that in an aspect under this invention, depending on the Relationship sought, a single Relationship request could potentially involve multiple Target Peers and not just be limited to one Target Peer. Such relationships requests could occur in both commercial and non-commercial domains: for example in a business setting, a company acting as a Source Peer, may seek a single relationship request with multiple workers acting as Target Peers, in the interest of forming a team to fulfill some function; similarly in a non-business setting, a student at an academic institution acting as a Source Peer, may seek a single relationship request with multiple other students acting as Target Peers, to form a study group in some discipline.

Figure 2:
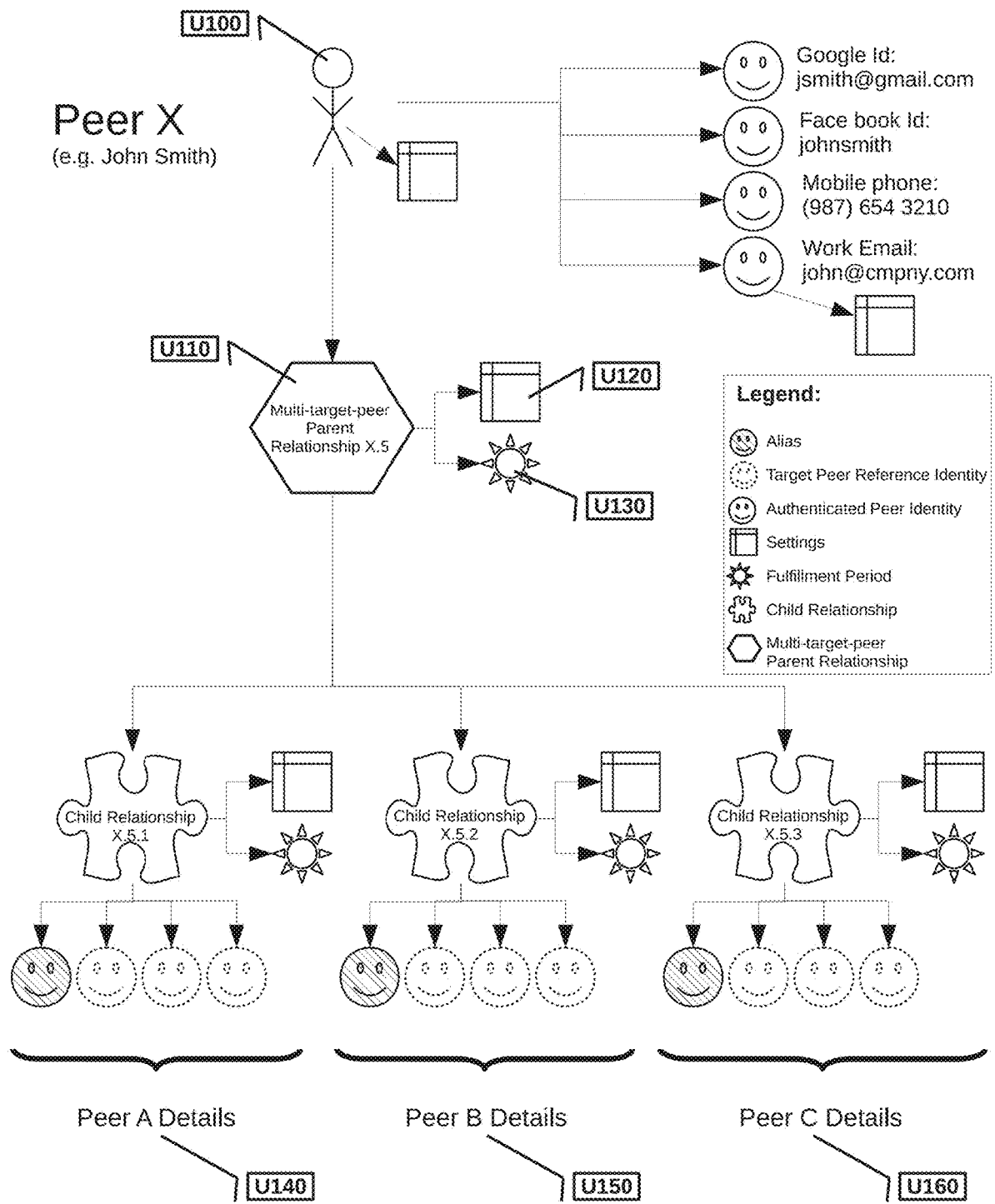
FIG. 2 illustrates a schematic representation of the information architecture of the peer registration and relationship fulfillment system for a Multi-target-peer relationship request according to an aspect of the present invention.

In an aspect, the information architecture and layout for a Multi-target-peer single Relationship Request is depicted in FIG. 2, for a Source Peer X U100 (with the same authenticated identities as shown in FIG. 1) seeking a Multi-target-peer Parent Relationship X.5 U110 with 3 Target Peers, Peer A, Peer B and Peer C. Similar to the single target peer relationship, Multi-target-peer relationship request U110 supports relationship settings U120 as well as fulfillment period U130, which were discussed earlier when covering FIG. 1. Under the embodiment depicted in FIG. 2, the Multi-target-peer Parent Relationship X.5 is referred to as a Parent relationship request, which references a Child Relationship request for each Target Peer that is to be a part of the Multi-target-peer request, namely Child Relationships X.5.1, X.5.2, X.5.3 for Peer A, Peer B and Peer C respectively. Each Child Relationship has Target Peer Reference Identities, Target Peer Alias, Relationship settings and Relationship fulfillment period, as depicted by Peer A Details U140, Peer B Details U150 and Peer C Details U160. Fulfillment of a Multi-target-peer Parent relationship request requires that some combination of its Child Relationship requests be fulfilled in order for the parent relationship to be considered fulfilled. The precise combination being specified via the setting U120 with embodiments supporting a variety of criteria such as: all Child Relationship requests be fulfilled; at least 'n' out of a total of 'm' child relationship requests be fulfilled, where 'n' and 'm' are positive integers with 'n' being less than or equal to 'm'; some specified 'mandatory' Child relationships be fulfilled while other specified 'optional' Child relationships may or may not be fulfilled; and so on. In the remainder of this application, to preserve the cogency of the explanation, a relationship will be discussed as being between a single Source Peer and a single Target Peer.

Figure 3:
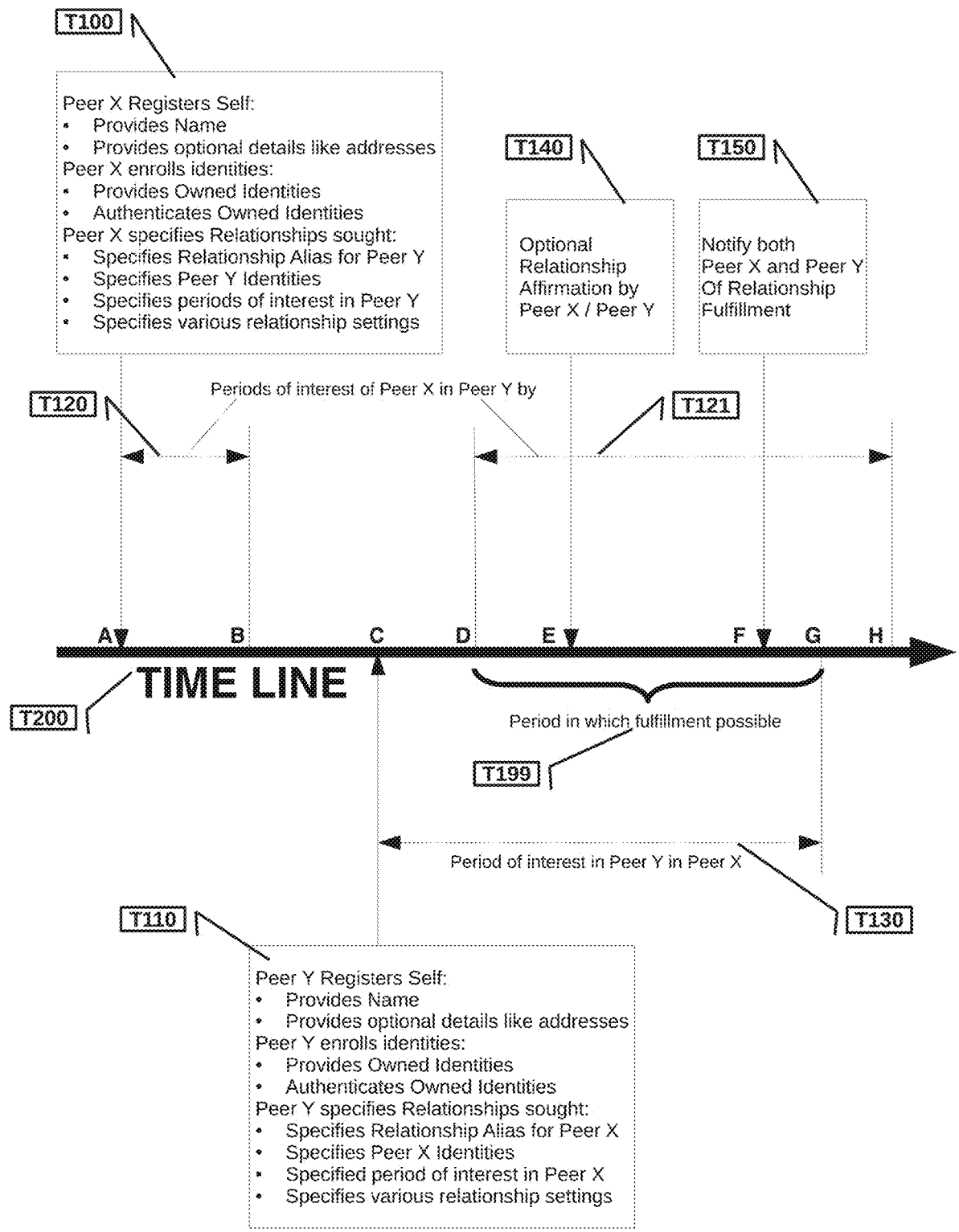
FIG. 3 illustrates a block diagram with a possible timeline of activities aligned with periods of active interest in seeking a relationship according to an aspect of the present invention.

In an aspect, the PRRF system can allow for relationships to be sought over pre-specified periods of time, where the time intervals that the relationship fulfillment is desired, do not necessarily have to be contiguous. Also as mentioned earlier, a Source Peer can submit a relationship request for a Target Peer, well before that Target Peer has registered. For example, FIG. 3 provides a temporal perspective of registration and fulfillment. T200 in FIG. 3 represents a timeline where time flows from left to right, with an example of activities occurring at various points in time A, B, C, D, E, F, G, H and time intervals depicted on either side of the timeline. As shown, Peer X initially registers with the PRRF system and carries out the activities listed in T100 including seeking a relationship with Peer Y at point A in time. The Source Peer can specify the time periods when they are actively seeking the fulfillment of each relationship. Peer X specifies that they are interested in seeking a relationship with Peer Y for the non-contiguous time interval T120 from point A to point B and interval T121 from point D to point H (depicted in FIG. 1 by Fulfillment period specification I140 for Relationship I122). In an aspect, after Peer X has registered at T100 and sought a relationship with Peer Y who has not yet registered, opportunities exist using the Peer X provided identities for Peer Y, to solicit Peer Y for registration. Solicitation is covered in more detail below (See FIG. 9). In the example timeline, Peer Y registers next at point C and specifies their interest in seeking a relationship with Peer X at T110. Peer Y is seeking a relationship with Peer X for a contiguous time interval of T130 from point C to point G (depicted in FIG. 1 by Fulfillment period specification I240 for Relationship I221). In an aspect, if no active relationship fulfillment period is explicitly specified, then the relationship request remains perpetually active until fulfilled.

FIG. 3 also depicts that the T121 period of interest of Peer X in Peer Y and the T130 period of interest of Peer Y in Peer X overlap for the period T199 from point D to point G and thus in this example, only for that overlapping time period T199 are both peers interested in seeking a relationship with each other. Both relationships can be fulfilled in overlapping periods with reciprocal interest, which in the example depicted in FIG. 3 is the period T199. At other points in time in the example, either only one peer has registered (time period from point A to point C, where only Peer X has registered and Peer Y has not registered) or both peers have registered but only one peer is interested in seeking a relationship with the other peer (time period from point C to point D only Peer Y is interested in seeking a relationship with Peer X; time period from point G to point H only Peer X is interested in seeking a relationship with Peer Y) and thus for these periods the relationships cannot be fulfilled. That is, according to the illustrated aspect, relationship fulfillment processing can occur if: (1) the second peer (Peer Y in this case) registers; (2) seeks a relationship with Peer X T110 via the PRRF system (Peer X has already registered and sought a relationship with Peer Y per T100); (3) the PRRF systems finds that the relationships are compatible; and (4) during periods when both peers are actively seeking to fulfill the relationships as detected by the PRRF system by periods of overlapping relationship fulfillment periods among the relationships.

T140 shows the affirmation steps being performed at point E in the time line for relationship fulfillment in accordance with the relationship settings (depicted in FIG. 1 by Relationship settings I130 for Relationship I122 and Relationship settings I230 for Relationship I221). Following positive affirmations from both Peers, notifications of relationship fulfillment T150 are sent at point F in the time line. It should be noted that the time line T200 in FIG. 3 is not drawn to scale. In an aspect, the time between Peer X registering T100 and Peer Y registering T110 could range all the way from being concurrent, to seconds, to minutes, to hours, to days or could even span years. However, once the PRRF system detects that Peer X and Peer Y are seeking compatible relationships with each other during an overlapping fulfillment period, then the subsequent affirmation and notifications activities commence rapidly from the start of the overlapping period and in accordance with the various relationship settings. Since there could be lapses in time, and in some cases significant gaps in time between a Peer authenticating his or her identities and being referenced with any of those identities by another Peer seeking to establish a relationship with them, some embodiments may require the Peers to reestablish ownership of the identities by continuing to authenticate their identities periodically.

While FIG. 3 shows Peer X at registration T100 enrolling identities and submitting relationship requests at the same time, the PRRF system does not require such coupling between these activities. Thus, in an aspect, after registering, Peer X could come back at a future point in time to enroll identities or even remove previously owned identities. Similarly, relationship requests can be added, removed or updated, e.g. by adding new identities for a Target Peer, at any time following a registration. Management aspects of Peer and relationship request details are discussed further below (see FIG. 15).

Figure 4:
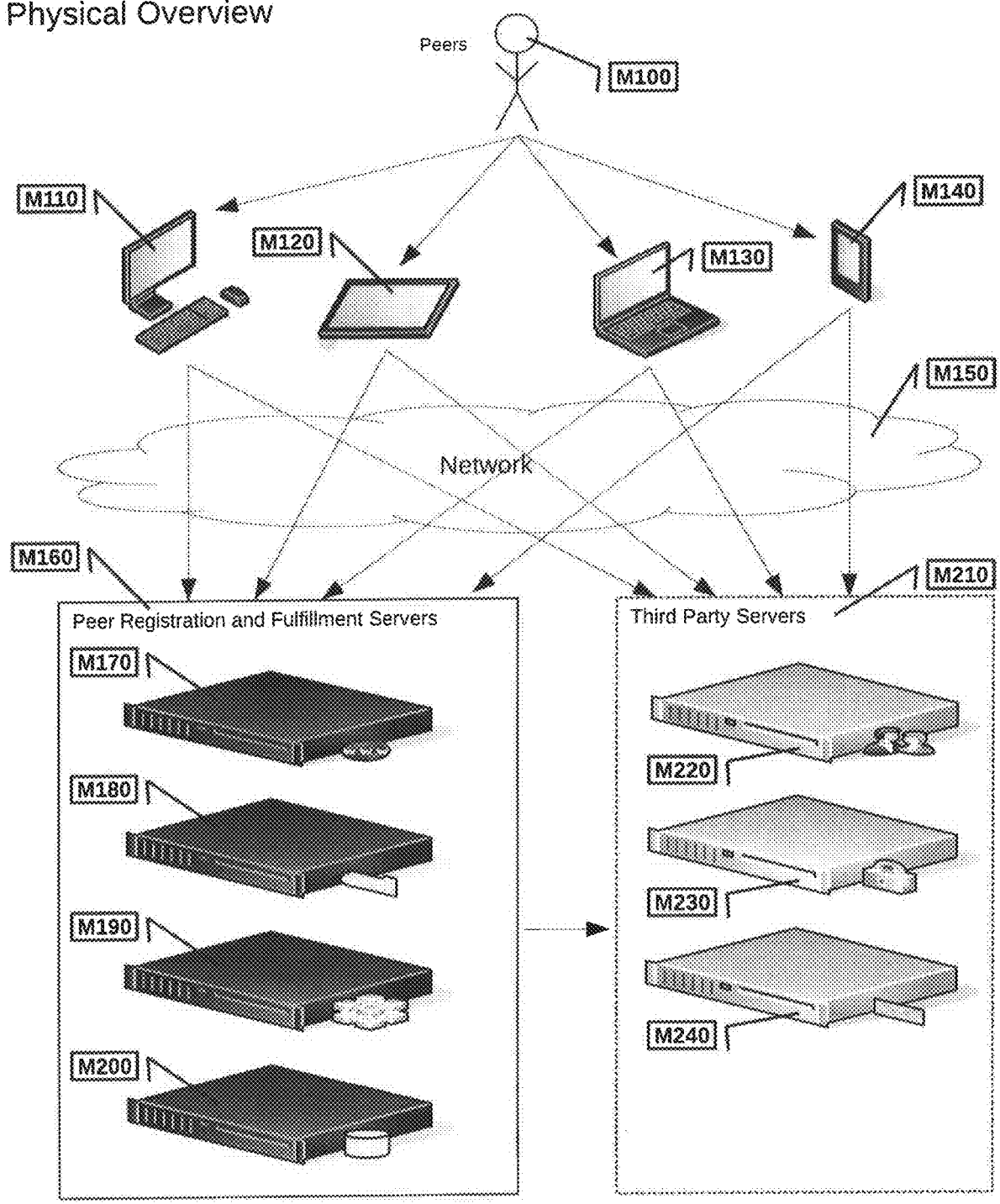
FIG. 4 illustrates a high level schematic representation of Peers physically interfacing with the peer registration and relationship fulfillment system according to an aspect of the present invention.

FIG. 4 illustrates a representation of the PRRF system, depicting how Peers could interface with the system. In an aspect, Peers M100 in FIG. 4 could use a variety of devices to interact with the system. For example, devices being utilized can include, but are not limited to, a desktop computer M110, a tablet device M120, a notebook computer M130, a smart phone M140. The devices shown are for illustrative purposes only, with the intent being to convey that a plurality of methods exist for the Peer to access the system including those not explicitly depicted, such as contemporary voice operated devices such as Amazon's Echo and human assisted access via a customer support help desk. The Peer uses a device to access other components of the PRRF system via a network M150 that run on a set of servers M160 and M210.

The embodiment depicted in FIG. 4 shows a variety of server types in the overall PRRF system: a Web Server M170 to handle the systems web content; a File Server M180 to handle the systems file resources and message queues; a contemporary Application Server M190 such as Red Hat's Jboss Enterprise Application Server in which the application can be deployed; a Database Server M200 in which the systems data would be persisted. As discussed earlier, different embodiments may delegate certain aspects of the PRRF system such as providing and maintaining identities and authenticating them to Third Parties. M210 depicts such Third Party servers that the Peer may also interact with during the course of registration and relationship fulfillment: M220 is a third party Directory Server that lists all the users served by an identity provider such as Google or Facebook; M230 is an Authentication Server that would provide authentication functionality to users of the identity provider; M240 is a third party Email Server that can be used by the system to send communications to the Peer. Note that the breakdown by server types and also the server types provided by third parties is for illustrative purposes only. For example it is possible to host the Application Server M190 and Database server M200 on one physical server as well utilize an in-house Email Server instead of a utilizing one from a Third Party. A more in depth delineation occurs when the application architecture itself is discussed below (see FIGS. 16-18).

Figure 5:
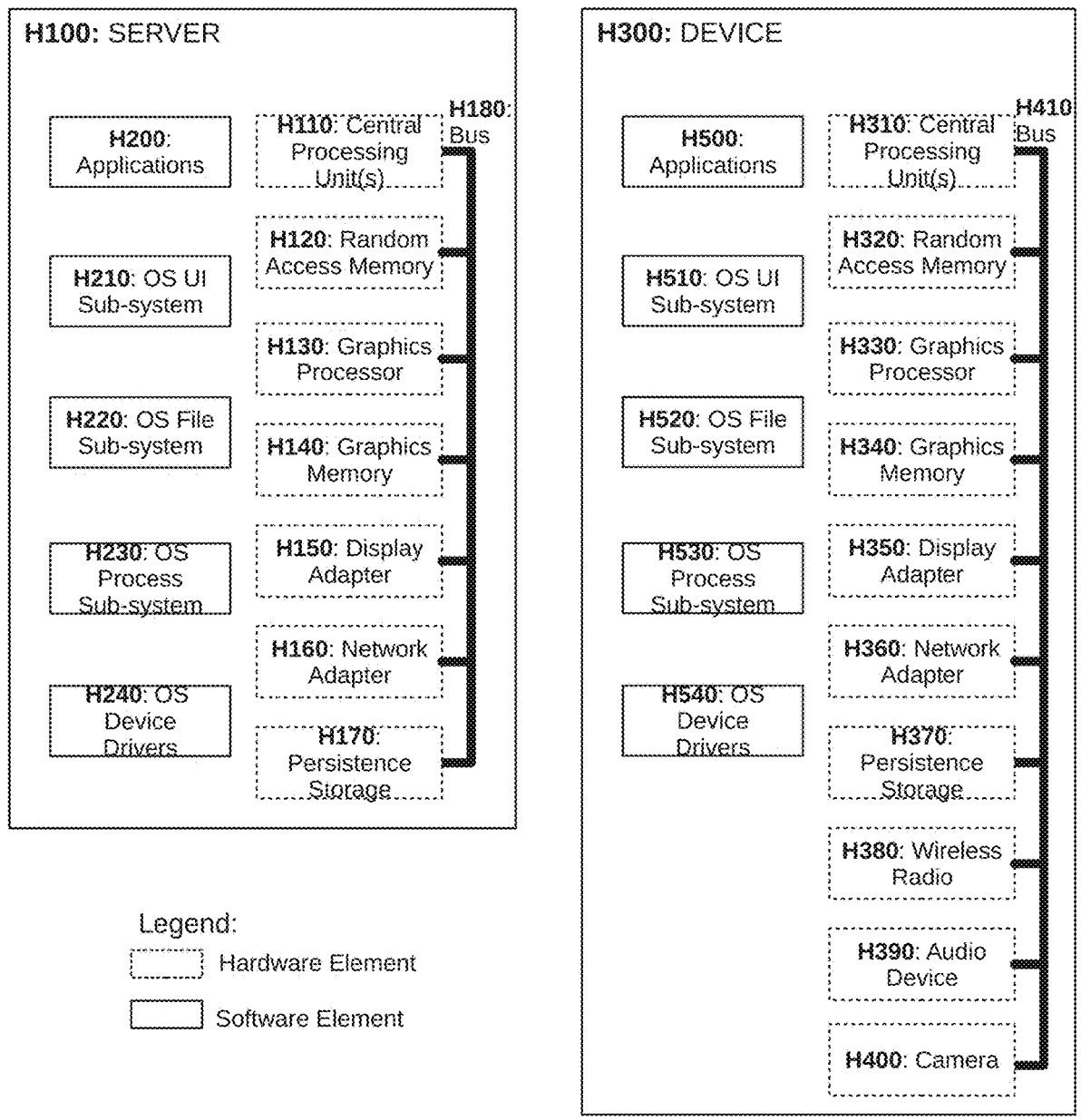
FIG. 5 illustrates a block diagram depicting the servers and devices utilized in the peer registration and relationship fulfillment system according to an aspect of the present invention.

According to an aspect, as shown in FIG. 5, a representative Server H100 that could be utilized by the PRRF system can include a number of hardware and software elements. Hardware elements include Central Processing Units (CPUs) H110 microprocessors that handle the main logic instructions; Random Access Memory H120 which includes both Random Access Memory (RAM) and Read only Memory (ROM) to store the instructions and data; Graphics Processor H130 and dedicated Graphics Memory H140 for graphics operations and data; Display Adapter H150 to which various display devices such as an LCD monitor can be attached; Network Adapter H160 to allow the server to connect to a computer network; and Persistent Storage H170 such as Hard disks, solid state disks, Compact Discs, Digital Video Discs, Blue-ray Discs, etc. to which data that outlives a power cycle can be stored. All of the hardware elements are connected via a Bus H180 that allows the elements to communicate with each other. For example the Central Processing Unit H110 would use the Bus H180 to read and write to Random Access Memory H120, read and write to the Network Adapter H160, and so on.

The hardware elements are controlled via software elements, the key constituent of which is the Operating System (OS). Most contemporary Operating Systems such as Linux, Microsoft Windows, Apple OSX are very modular with the OS functionality being provided by various OS-modules such as: H240 Device Drivers to write to various devices such as networks, hard disks, optical media, USB ports, etc; H230 Process sub-system to manage running processes; H220 File sub-system to handle read and write to files; H210 User Interface (UI) sub-system to handle various graphics operations. Applications H200, such as the components of the PRRF system, are deployed on top of the operating system. Applications use various application programming interfaces (APIs) provided by the Operating System, to execute various instructions on the processors and access the hardware.

According to another aspect shown in FIG. 5, a representative contemporary device H300 utilized by the Peer to interact with the PRRF system, such as M110, M120, M130, M140 depicted in FIG. 4, too are very similar internally to servers. Such devices as shown in FIG. 5 have similar hardware components to servers and provide similar functionality as discussed earlier: H310 Central Processing Units (CPUs) microprocessors; H320 Random Access Memory, both RAM and ROM; H330 Graphics processor; H340 Graphics Memory; H350 Display Adapter; H360 Network Adapter; H370 Persistent Storage; all of which are interconnected via the Bus H410. Additionally devices, especially mobile devices such as smart phones, tablets etc., may have even more hardware elements such as: H380 Wireless Radio of various types to allow the device to connect to networks such as the internet using WiFi with IEEE 802.11b/g/n/a/ac protocols or Cellular with G/3G/4G capabilities or to other devices using Bluetooth; H390 Audio devices such as speakers and microphones; multiple H400 Cameras. Like servers, devices also run Operating Systems (OS), some of which, such as Google's Android OS or Apple's iOS, are specialized for mobile devices. The high level functionality provided by the OS on a mobile device is similar to that on servers: H510 UI sub-system; H520 File sub-system; H530 process sub-system; H540 device drivers. Applications H500, such as the components of the PRRF system that run on the device, then use OS APIs to execute instructions on the processors and access the hardware.

Figure 6:
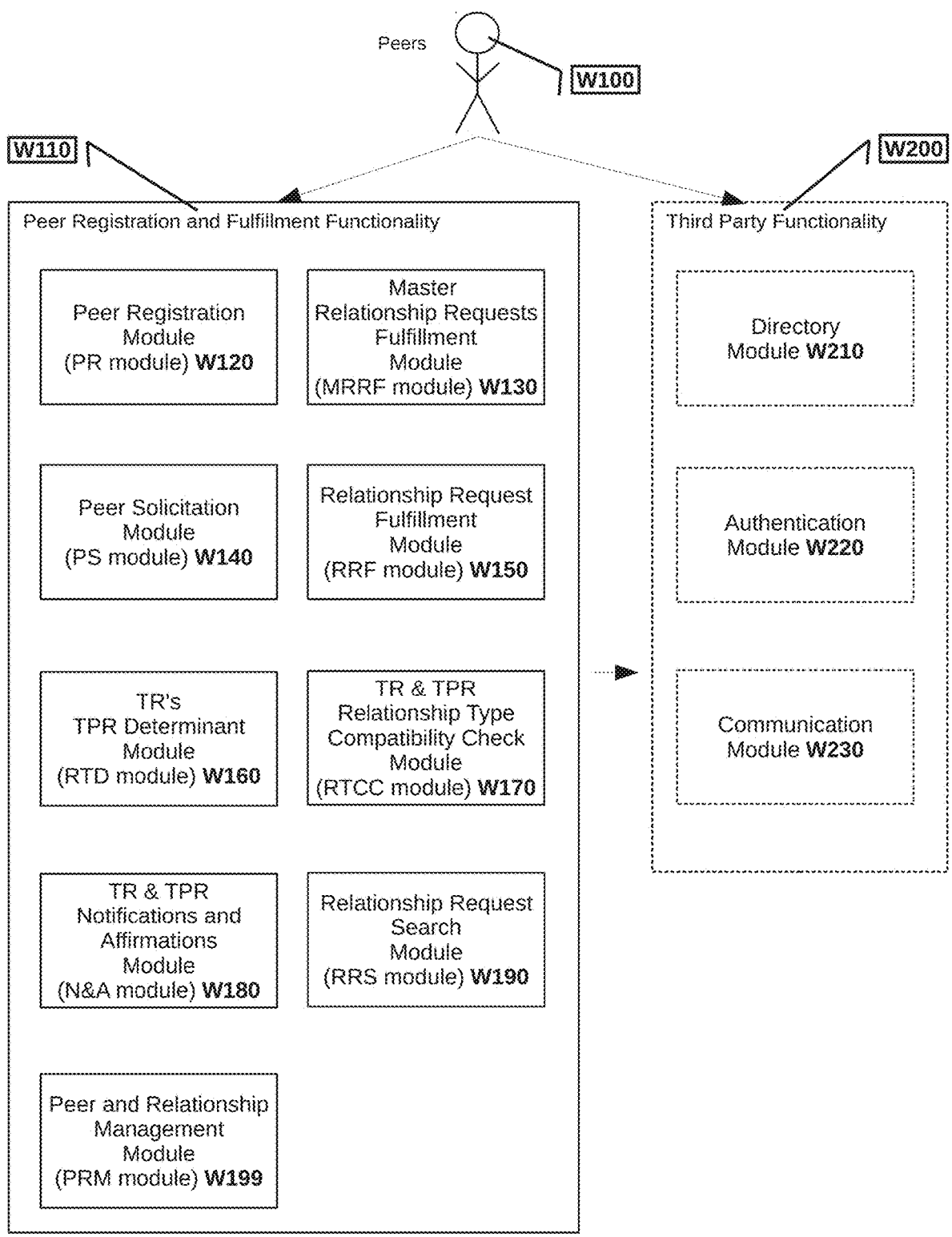
FIG. 6 illustrates a block diagram depicting the functions of the peer registration and relationship fulfillment system according to an aspect of the present invention.

FIG. 6 provides a functional perspective of the PRRF system depicting functional modules that make up PRRF system. The overall system and method involves Peers W100 in FIG. 6 accessing and interacting with the various modules of the PRRF system. In an aspect, the PRRF system can include specific functional modules W110 made specifically for the PRRF system, as well as integrating of off-the-shelf modules W200 provided by third parties. The Peer Registration module (PR module) W120 addresses the functionality of the method and system to register Peers. All relationship requests submitted by Peers are processed by the Master Relationship Requests Fulfillment module (MRRF module) W130, which in turn uses the Peer Solicitation module (PS module) W140 and the Relationship Request Fulfillment module (RRF module) W150 to carry out such processing. The PS module W140 addresses the functionality of the PRRF system to solicit any Peers that haven't as yet registered or have unauthenticated identities. The RRF module W150 fulfills a relationship request submitted by a Peer.

In order to fulfill the relationship request, the RRF module W150 utilizes The Relationship's (TR's) Target Peer Relationship (TPR) Determinant module (RTD module) W160, TR and TPR Relationship Type Compatibility Check module (RTCC module) W170 and the TR & TPR Notifications and Affirmations module (N&A module) W180. Fulfilling relationship requests requires TR's TPR be determined. This functionality is provided by the RTD module W160. Assessment of the found TPR's Relationship Type compatibility with that of the TR's Relationship Type is carried out by the RTCC module W170. The N&A module W180 addresses the functionality of the PRRF system to notify Peers regarding their registration and fulfillment activities and process their responses, as well as handling any affirmations required from the Peers with regard to relationship fulfillment.

The Relationship Request Search module (RRS module) W190 handles the search functionality which allows Authenticated Peers to find relationship requests that have a visibility setting making them visible to any Authenticated Peer. In an aspect, over a period of time Peers could carry out a myriad of interactions with the PRRF system such as: adding identities; authenticating identities; updating identities; deleting identities; adding relationship requests; updating relationship requests; deleting relationship requests, etc. Such functional concerns of the method and system are addressed by the Peer and Relationship Management module (PRM module) W199. Additionally, the method and system may utilize functionality provided by third parties W200. In an aspect, the Directory module W210 is configured to provide directory functionality for Peers for which the third party is the identity provider. In an aspect, the Authentication module W220 is configured to provide authentication functionality for Peers for which the third party is the identity provider. In addition, the Communications module W230 is configured to provide the functionality to be able to communicate with Peers via electronic communications such as email, SMS text, etc. The functional modules of the PRRF system are discussed in detail in the below sections.

Figure 7:
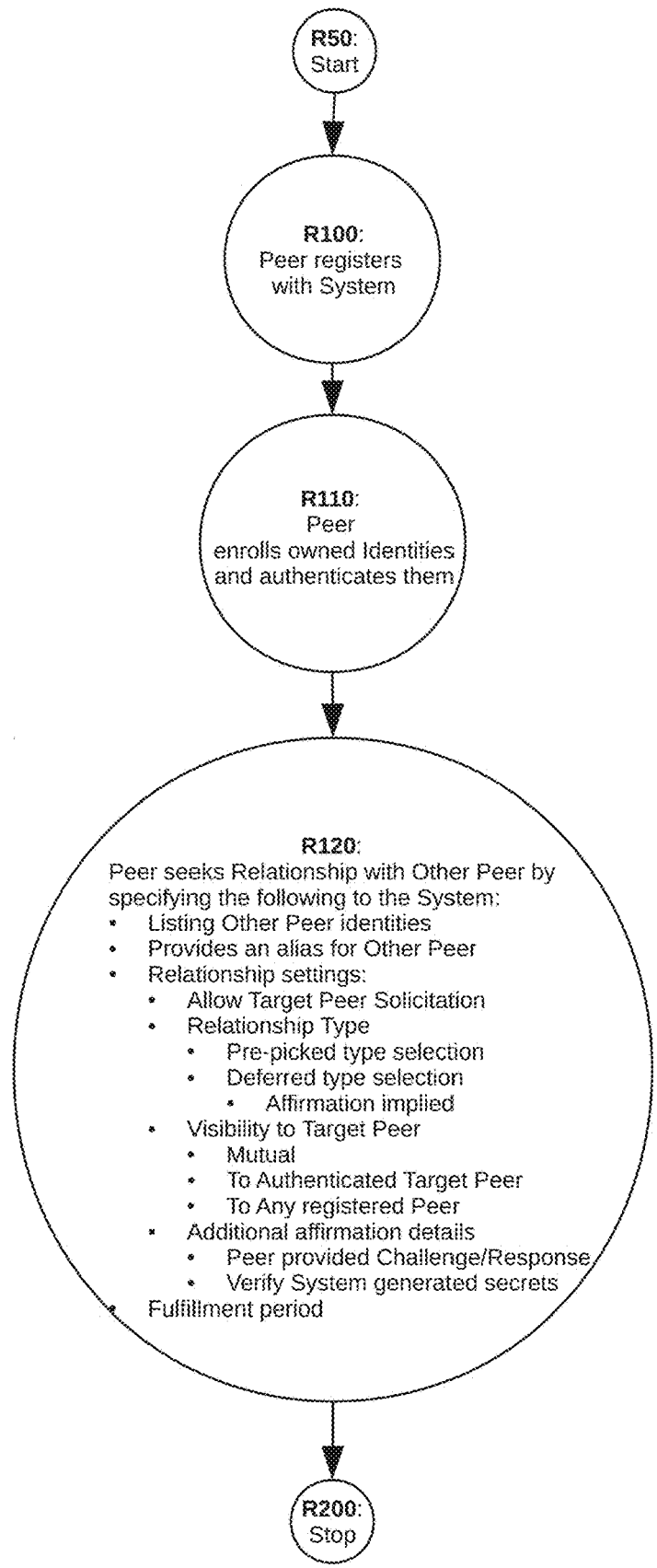
FIG. 7 illustrates a flow diagram depicting a Peer registering, enrolling owned identities and submitting a request for relationship according to an aspect of the present invention.

FIG. 7 illustrates the registration process of the PRRF system, according to an aspect, as carried out by the Peer Registration module (PR module) W120. Referring to FIG. 4, Peers interact with the PRRF system using some form of computing device(s) such as a laptop computer, tablet computer or mobile phone which is connected to the network. A user interface is presented to the Peer by the PR module W120, which is made up of forms with fields that require input from the Peer. The user interface instructs the Peer on the data entry required for each field on the form, clearly outlining the mandatory and optional fields. Upon entering these details, the Peer agrees to confirm and sends the data to the PRRF system (e.g., by clicking on some user interface element such as a 'Submit' button). Utilizing a network of computers such as the Internet, the computing device then sends the information submitted by the Peer and stores it on media at some central location of computers where it can be readily accessed for further processing, in due course.

The PR module W120 is described in terms of a Peer X registering with the PRRF system and seeking a relationship with another Peer Y. It should however be realized that the PR module W120 itself functions for any peer registering and seeking a relationship with any other peer or peers. The PR module W120 commences from step R50 in FIG. 7 where in a Peer X desires to register with the PRRF system and seeks a relationship with a Peer Y. At step R100, Peer X is requested by the PR module W120 to provide minimal information like their name, any Peer level settings, and optional information like addresses in order to register. These types of registration forms are common in the user interfaces of contemporary internet services such as Facebook, Google's Gmail and in web commerce systems such as Amazon.com. To accomplish the registration, the Peer X provided registration details are stored by the PRRF system.

Next at R110, Peer X enrolls their various identities, provides any Identity level settings for those identities and authenticates them to validate that they are the genuine owner of each identity. The Peer can enter their identity and the identity type and can then initiate the authentication process for that identity by submitting the identity to the PR module W120. The steps are repeated for each owned identity. For example, if Peer X has a Facebook identifier of 'johnsmith', then they have to prove to the system that they are the genuine owner of the 'johnsmith' identity in Facebook Given the various possible identity types, there are various authentication methods as well. For example, the identity could be from a provider that supports the OAuth protocol based authentication. The PR module W120 would then integrate with such providers using the OAuth protocol to validate the identities. Popular contemporary OAuth providers include Facebook, Google etc.

In another embodiment, the identifier could be an email address. Authentication that the Peer owns that email address may occur via the sending of an email by the PRRF system to that email address, containing some secret information known to the PR module W120 with a request to the Peer to provide that secret information back to the PRRF system. The Peer, if they are the genuine owner of that email address would be able to access the email account associated with that email address, read the email and its secret content and provide the secret back to the PR module W120 to confirm email address ownership. The PR module W120 would provide an appropriate user interface to allow entry of the secret by the Peer, as well as relevant processing to compare the Peer provided secret with that on file with the PR module W120 and on the values being identical, the PR module W120 would then mark the email address identity as being owned by the Peer.

In another embodiment the identifier could be a mobile phone number. Authentication that the Peer owns that mobile phone number may occur via the sending of a text message to that mobile phone number containing some secret information known to the PR module W120 with a request to the Peer to provide that secret information back to the PRRF system via the PR module W120. The Peer, if they are the genuine owner of that mobile phone would be able to access the mobile phone, read the text message and it's secret content and provide that back to the PR module W120 to confirm mobile phone number ownership. Similarly, in an additional embodiment for establishing ownership of a landline phone number, an actual voice message containing the secret could be utilized instead of a text message.

In another embodiment ownership of a residential address can be established by mailing the Peer a secret to that residential address and requiring the Peer to validate the mailed secret back to the PR module W120. In other embodiments, a proxy identity could be utilized, e.g. using a billing address on a credit card that has been validated by the Peer with a credit card payment processor system, as a proxy for a residential address identity, allowing the Peer to stake ownership of that address.

Other embodiments may include inference of identity ownership utilizing a plurality of third party systems. For example to establish ownership of a motor vehicle tag plate number, the Peer would be required to provide the tag plate number and details of an active credit card whose billing address would require to be validated by the Peer with a credit card payment processor system. With prior permission from the Peer and the Department of Motor Vehicle (DMV), the PR module W120 would then access the DMV systems, and using the Peer provided tag number, attempt to match the address on file for the motor vehicle in the DMV systems with the validated credit card billing address. Where both addresses match, the PR module W120 would associate the motor vehicle tag number as a validated identity of the Peer.

Other embodiments may utilize biometrics such as facial recognition and allow a Peer's natural traits, such as the Peer's facial features captured via a photograph, to serve as identities of the Peer. Such embodiments can carry such steps out via automated or manual means. For example, in an automated setting, the Peer would stand in front of a PR module W120 operated and controlled camera and the PR module W120 would take their photograph. Such a photograph would serve as that Peer's registered owned identity. A Source Peer wishing to seek a relationship with the Target Peer would simply submit a photograph of the Target Peer and the PRRF system would perform facial recognition and compare the Source Peer submitted photograph with the stored live Target Peer provided photograph and validate that the Source Peer's request is indeed for the same Target Peer.

In a manual setting, instead of utilizing PR module W120 operated cameras, which may perhaps be prone to error in not being able to correctly detect a live individual, the Peer may be required to be present themselves at photograph booths operated by PRRF system authorized personnel who would take the photograph and thus confirm that the individual is indeed a live person. In an embodiment authorized personnel can be additionally utilized in the facial recognition process, where the PR module W120 performs an initial automated validation that the Source Peer provided photograph is for the same individual registered as the Target Peer with a photograph identity, however, a person thereafter conducts another supplemental examination of the photographs to provide a final confirmation.

Referring to FIG. 7, at R120, the Peer specifies the relationships that they are seeking with other Peers. As shown, Peer X is the Source Peer seeking to establish a relationship with a Target Peer Y and must provide details about the other Peer Y and the specifics of the relationship they seek with the other Peer Y. To uniquely identify Peer Y as the target of the relationship request, Peer X provides to the PR module W120 as many of the identities of Peer Y of which Peer X is aware. These Peer X provided Peer Y identity references will be used to find Peer Y's registration with the PR module W120 as explained further on in this document.

While the PRRF system aims to assist altruistic Peers, it is possible that a Source Peer may be seeking a relationship only to exploit any acceptance by a Target Peer, corroborated with a PRRF system acknowledgement of the relationship acceptance, for illegitimate purposes. There are references to the Target Peer in the Source Peer's relationship request, such as the Target Peer Reference Identities (e.g. I160 in FIG. 1), which the PRRF system validated and confirmed indeed belonged to the Target Peer (e.g. I211 in FIG. 1) during the course of fulfilling the relationship request (e.g. depicted via I170 in FIG. 1). If the PRRF system were to display a user interface screen for a fulfilled relationship request from a Source Peer, displaying some system validated reference to the Target Peer such as a Target Peer Reference Identity, a malicious Source Peer could capture a screenshot of this screen and possibly use it for illegitimate purposes. To avoid such abuse, references to the Target Peer in the relationship request, such as Target Peer Reference Identities, are hidden from the Source Peer, prior to any fulfillment related communications with the Source Peer. With the unavailability of Target Peer references from a relationship request during fulfillment, some means needs to be provided to the Source Peer to associate which Target Peer the relationship fulfillment pertains to. In an embodiment, the Source Peer can provide an alias for the relationship request which carries some semantic meaning about the relationship and the Target Peer (e.g. I150 in FIG. 1).

In another embodiment, the PRRF system could provide some moniker for the relationship that is independent of the Target Peer, e.g. a sequentially increasing number, sequence of alphabets, fictional characters, caricature avatars, etc. R120 depicts the Alias embodiment, where Peer X provides an Alias of Peer X's choosing for that relationship with Peer Y, as a part of the relationship request. The Alias serves as a tag provided by the Source Peer for the relationship, which is independent of the identities of the Target Peer and not validated by the system in anyway. Thus in the example scenario discussed above, for fulfilled relationships requests from a Source Peer, the user interface screen would only show the Source Peer provided Alias for the relationship request with the Target Peer and none of the PRRF system validated references to the Target Peer such as the Target Peer Reference Identities. A malicious Source Peer could still take the screenshot of the user interface screen but it would only contain information not validated by the PRRF system and thus not of much value for any illegitimate activities. It is conceivable that in the Alias embodiment depicted in FIG. 7, a malicious Source Peer could set up the Alias to be the same as a Target Peer Reference Identity. However, the Alias would be clearly specified to be information that is not validated by the PRRF system as a part of fulfillment. Thus for example, there would be nothing to prevent the Source Peer from choosing an Alias of barack.obama@whitehouse.gov with a potential user interface screenshot of a fulfilled relationship request displaying that Alias. This would not signify that the relationship was fulfilled with the US President, since the Alias is just a Source Peer provided tag for the relationship.

In another embodiment, while the default behavior could be that references to the Target Peer in the relationship request are hidden from the Source Peer prior to any fulfillment related communications with the Source Peer, a Target Peer could be allowed to override this behavior via a Relationship request level setting or a Peer level setting, to allow their references to be made available. In an aspect, the PRRF system may even allow such a setting change to be made retroactively after a relationship has been fulfilled. A situation where such a setting may be useful is when both Peers wish to retain a memento of their fulfilled relationship, e.g. a marriage proposal, by allowing the relationship requests for each other to display actual references. Referring to FIG. 1, prior to any communication to Peer X regarding the fulfillment of relationship request Relationship X.2 I122, Peer Y references such as the identity I160 are hidden and only the alias I150 remains. Similarly for Peer Y, prior to any communication to Peer Y regarding the fulfillment of relationship request Relationship Y.1 I221, Peer X references such as identity I260 are hidden and only the alias I250 remains. Some embodiments may allow this behavior to be overridden by allowing Peer Y, via a Peer level setting I231 or via a relationship level setting I230, to permit Peer X's relationship request Relationship X.2 I122 targeting Peer Y, to show Peer Y references such as identity I160 during or even after fulfillment. In similar embodiments, Peer X, via a Peer level setting I131 or via a relationship level setting I130, the PRRF system could permit Peer Y's relationship request Relationship Y.1 I221 targeting Peer X, to show Peer X references such as identity I260 during or even after fulfillment.

Referring to FIG. 7, at step R120, the Source Peer, Peer X, can also specify various relationship request settings for the relationship that is being sought with the Target Peer, Peer Y. A relationship request can have various settings associated with it that determine how the relationship fulfillment is carried out including, but not limited to, Target Peer solicitation, Relation Type, Visibility of relationship request, and Affirmations details. In an aspect, a plurality of visibility options are possible. For example, a Relationship request's visibility to the Target Peer is one such setting that is specifiable by the Source Peer. Visibility options include, but are not limited to, visibility of relationship request to any authenticated Peer, visibility of relationship request to authenticated Target Peer, mutual visibility. For example, the Source Peer's relationship request could be marked as being visible to an Authenticated Target Peer. In this case a Target Peer who has authenticated with one of the identities listed in the Relationship request for the Target Peer, is notified of the relationship interest of the Source Peer, and, depending on the settings, even the Relationship Type. In an aspect, the Source Peer may or may not be notified that the Target Peer was made aware of their interest, discussed more detail below (see FIG. 10 and Table 2).

Another visibility setting includes the Source Peer's relationship request being marked as being visible to any registered Peer in the PRRF system. In this case any registered Peer, including those that have not authenticated the identity specified in the relationship for the Target Peer, can search for such relationship requests and find out about the Source Peer's interest in the Target Peer, including even the Relationship Type, dependent on the settings. Details of such searching relationship requests with visibility to any authenticated Peer are discussed below (see FIG. 14 and Table 3). The prior visibility options for a relationship request address scenarios where a Peer has a relationship request seeking relationship with another Peer but the relationship request's visibility does not require that the other Peer also have made a reciprocal relationship request for the former Peer. The Mutual visibility option addresses such cases where there are reciprocal relationship requests required between Peers before they are notified of the mutual interest in each other. Under the Mutual visibility option, the Target Peer is only made aware of a Source Peer's relationship interest, when the Target Peer too reciprocates that relationship interest in the Source Peer. That is under the Mutual visibility option, the two Peers are only notified if they both have relationship requests targeting each other with compatible relationship types; otherwise the relationship requests are kept confidential from each Peer without any disclosure of interest to either Peer. This aspect of the Mutual visibility option can be observed in the RRF module W150, discussed below.

It should be realized that in principle the relationship request's visibility settings are not mutually exclusive, allowing for a relationship request to have one or more visibility types be concurrently effective. For example, a Source Peer can specify for a relationship request, a visibility to any authenticated Peer with certain settings (as covered later when discussing Table 3) while at the same time also specify mutual visibility with its own Peer level settings. However, various embodiments of the PRRF system can instead choose to allow only a single visibility selection per relationship request and instead allow the Source Peer to create separate relationship requests with different visibility selections. Thus in the prior example, the PRRF system could instead allow a Peer to create two relationship requests with all other attributes being identical, except that one relationship request would have a visibility selection of any authenticated Peer (and any associated disclosure variants discussed in Table 3 below) and the other relationship request a visibility selection of mutual visibility.

Relationship Type is another setting which denotes the kind of relationship that the Source Peer is seeking with the Target Peer, as the Source Peer specifies the Relationship Request depicted by R120 in FIG. 7. A plurality of Relationship types are supported by the PRRF system. Relationship types may include, but are not limited to, a date for a Prom, a marriage proposal, a job offer, seeking intimacy, chess partner, a platonic friendship, and various other types of relationships Peers could pursue. Relationship types may be presented as a selection from a list of PRRF system provided predefined values, or it may be free-form which would allow the Source Peer to enter a type of their choosing. In an aspect, the Relationship Type selection could be single or multi-valued, with the latter allowing the Source Peer to seek different types of relationships in a single request. Alternatively in another aspect, the Source Peer could create separate relationship requests with a single or a subset of desired relationship types per relationship request. Relationship Types may have additional attributes as well. For example, a job offer Relationship Type may include as additional attributes of that Relationship Type, a salary range, health benefits, annual leave, retirement plan contributions etc. Also, in the case of multiple Relationship Types being specified by both Peers as they seek a relationship with each other, an ordering of Relationship type from most preferred to least preferred can be additionally included.

Since a plurality of Relationship Types are feasible while setting the Relationship Type for a Relationship request, the determination of Relationship Type compatibility of Relationship requests may then also consist of a plurality of approaches. A sampling of Relationship types and compatibility approaches are provided here for illustrative purposes:

a. In embodiments where each Relationship request only supports a single Relationship Type, compatibility check may involve verifying that the Relationship Type selections are identical. Under a single Relationship Type per Relationship Request embodiment, a Source Peer seeking multiple Relationship Types with a Target Peer could simply create multiple Relationship requests with the same Target Peer but with different Relationship Types for each request.
 b. In embodiments where a Relationship request could support the specification of multiple Relationship Types by the Source Peer, compatibility check in such embodiments can then take the form of identifying all the Relationship Types that are consistent between the pair of Relationship Requests under consideration. A minimum of one consistent relation type would be needed to pass the Compatibility check.
 c. In embodiments where a Relationship requests allows for an ordered Relationship Type, a Source Peer could select a Relationship Type level for a Relationship request and further specify that any Relationship Type level below and up to that level from the reciprocal Relationship request would be required to pass the compatibility check.
 d. In embodiments addressing business related relationships, a Relationship request's Relationship Type may be specified via a collections of attributes such as Salary Range, an hourly Rate, a minimum wage, health benefits, annual leave, etc. The compatibility check would then be in accordance with the Relationship Type attributes under consideration.
 e. In embodiments that seek to not be confined to a pre-determined domain of Relationship types, Source Peers may be allowed to specify a free-form Relationship Type. In such cases a combination of one or more of fuzzy logic, artificial intelligence based and pattern matching algorithms could be utilized to assess the Relationship Type compatibility.
 f. In embodiments where the domain of Relationship types is uncommon, e.g. types sought by niche communities or cultures, a Peer could be allowed to enter a free-form Relationship type and then that value for Relationship type could be dynamically added to the system. Such dynamically added values could then be made available to all other Peers or be limited to the Target Peers of the Peer that introduced the new Relationship type.

Note that embodiments are not limited to supporting only a single Relationship Type and compatibility check approach and may utilize a combination of approaches as well.

Instead of pre-picking the Relationship Type at the time of submitting the relationship request, the Peer can instead choose to defer Relationship Type selection until being notified that the PRRF system has detected that the two Peers are seeking a relationship with each other. The Peer may elect to defer the Relationship Type selection in order to have first obtained the initial feedback that the Target Peer is also seeking a relationship with them, and then the Peers can determine the type of Relationship they seek. Deferring the Relationship Type selection also allows the Peer to back out of the Relationship request at the point of being notified that the Target Peer is also seeking a relationship with them (a Peer deferring relationship type selection can back out of a relationship request by simply not making a Relationship Type selection when asked to do so, in response to which the PRRF system will report to each Peer in the relationship that the relationship types were incompatible). Compared to a Peer who has pre-picked the Relationship Type at the time of making the Relationship request, a Peer who elects to defer the Relationship Type selection until being notified of the other Peer's relationship request for them, has an upper hand. In this situation, the Peer seeking to defer Relationship Type election until notification can make a Relationship Type selection based on the knowledge of the Relationship Type selected by the other Peer, or, alternatively, can back out of the Relationship altogether by for example not making a Relationship Type selection when prompted to do so.

Depending on the circumstances, it may be acceptable to a Peer to seek a relationship despite this downside. For example in a jobs setting, a Company acting as a Source Peer can have a Prospective-employee as a Target Peer, where the Company elects to directly provide the job position and annual salary as a part of the relationship type request. The Prospective-employee in their own relationship request may seek to defer Relationship type selection until the Prospective-employee is made aware of the relationship request from the Company seeking to employ him or her. That is, the Company does not wait until it receives a notification that the Prospective-employee also wishes to work for the Company before making the offer. In such cases one Peer, such as the Company in the prior example, is not seeking relationship type pre-picked parity with the other Peer, such as the Prospective-employee in the example. Table 1 provides the possible combinations of a Relationship request's Relationship Type to be Deferred, Pre-picked with Parity preservation, or Pre-picked without Parity preservation, by a Peer X as they seek a relationship with a Peer Y, and the congruence of each combination, under a possible embodiment.

TABLE 1

Relationship Type Selection Temporal Congruence

|  |  | Peer X's Relationship Request with Peer Y | | |
|---|---|---|---|---|
|  |  | Deferred | Pre-picked with Parity | Pre-picked without Parity |
| Peer Y's Relationship Request with Peer X | Deferred | [A1] Deferred | [B1] Incongruent | [C1] X: Pre-picked Y: Deferred |
|  | Pre-picked with Parity | [A2] Incongruent | [B2] Pre-picked | [C2] Pre-picked |
|  | Pre-picked without Parity | [A3] X: Deferred Y: Pre-picked | [B3] Pre-picked | [C3] Pre-picked |

Each combination under that embodiment is described:

[A1]: Peer X's Relationship request with Peer Y seeks to defer the Relationship type selection; Peer Y's Relationship request with Peer X seeks to defer the Relationship type selection. The Relationship requests are congruent, with the Relationship Type selection being deferred, till both Peers are notified of a relationship request from each other.

[B1]: Peer X's Relationship request with Peer Y seeks to have the Relationship type selection be pre-picked, with Peer X already having made some selection of Relationship Type; Peer Y's Relationship request with Peer X seeks to defer the Relationship type selection. These Relationship requests are incongruent and even though the system will detect that the Peers are seeking relationships with each other, no notifications will take place.

[C1]: Peer X's Relationship request with Peer Y seeks to have the Relationship type selection be pre-picked, with Peer X already having made some selection of Relationship Type and additionally Peer X does not seek to preserve parity in relationship request's processing; Peer Y's Relationship request with Peer X seeks to defer the Relationship type selection. The Relationship requests are congruent, with the Relationship Type selection being deferred for Peer Y only. Only Peer Y will be notified to make a Relationship Type selection at the point of the system detecting that two Peers are seeking a relationship with each other. Upon Peer Y's making a Relationship Type selection or failing to do so in a specified time, both Peers will be notified of Relationship Type compatibility or lack thereof and accordingly instructed on follow on steps.

[A2]: This is the same behavior as cell B1 with selections and request processing of Peer X and Peer Y reversed.

[B2]: Peer X's Relationship request with Peer Y seeks to have the Relationship type selection be pre-picked, with Peer X already having made some selection of Relationship Type; Peer Y's Relationship request with Peer X seeks to have the Relationship type selection be pre-picked, with Peer Y already having made some selection of Relationship Type. The Relationship requests are congruent, with the pre-picked Relationship Type being used for assessing Relationship Type compatibility. If the Relationship Types are found to be compatible, then both Peers are notified of a relationship request from each other.

[C2]: Peer X's Relationship request with Peer Y seeks to have the Relationship type selection be pre-picked, with Peer X already having made some selection of Relationship Type and additionally Peer X does not seek to preserve parity in relationship request's processing; Peer Y's Relationship request with Peer X seeks to have the Relationship type selection be pre-picked, with Peer Y already having made some selection of Relationship Type. The Relationship requests are congruent, with the pre-picked Relationship Type being used for assessing Relationship Type compatibility. If the Relationship Types are found to be compatible, then both Peers are notified of a relationship request from each other.

[A3]: This is the same behavior as cell C1 with selections and request processing of Peer X and Peer Y reversed.

[B3]: This is the same behavior as cell C2 with selections and request processing of Peer X and Peer Y reversed.

[C3]: Peer X's Relationship request with Peer Y seeks to have the Relationship type selection be pre-picked, with Peer X already having made some selection of Relationship Type and additionally Peer X does not seek to preserve parity in relationship request's processing; Peer Y's Relationship request with Peer X seeks to have the Relationship type selection be pre-picked, with Peer Y already having made some selection of Relationship Type and additionally Peer Y does not seek to preserve parity in relationship request's processing. The Relationship requests are congruent, with the pre-picked Relationship Type being used for assessing Relationship Type compatibility. If the Relationship Types are found to be compatible, then both Peers are notified of a relationship request from each other.

FIG. 7 R120 denotes a Peer X making a single relationship request for a single other Peer Y. Note though that a Peer can submit relationships requests for any number of Target Peers at any time, whether it be a for a Target Peer that has already registered or a Target Peer that as yet hasn't registered. Also it's possible that in other embodiments of the PRRF system, a single Peer X could make multiple concurrently active relationship requests for the same Peer Y, albeit with different settings. In such embodiments, an order of precedence of relationship request fulfillment could be provided by a plurality of approaches such as direct specification by the Source Peer, explicitly provided by the system, algorithmically inferred by the system, and various other approaches.

Upon detecting that two Peers are seeking compatible relationships with each other, the PRRF system is in a position to notify both Peers of the fulfillment of their relationship requests. However, there may be situations where the Peers may seek further affirmations before engaging with each other. An Affirmation is another check carried out with the Peers to confirm that the Peer still remains interested in pursuing the relationship. For example, it is possible that the relationship request was setup with a large fulfillment time period, whereby in the time the relationship becomes fulfillable, enough time has passed that the Peers desire to seek an affirmation before engaging with each other. As another example, the relationship request may be of a very sensitive nature such that the Peers seek affirmations before engaging further with each other. In R120 of FIG. 7, Peer X can specify any additional affirmations required as a relationship request setting.

The Peer can select from a plurality of affirmation types, which include, but are not limited to, implicit affirmation via deferred relationship type selection, explicit affirmations via Peer provided challenge/responses or via system provided challenge responses. For example, a Deferred relationship type selection serves as an implicit affirmation, since by being prompted to make a relationship type selection for a relationship request, the Peer knows of the other Peer's interest in them. Making a Relationship Type selection can be inferred as a positive affirmation to proceed further with fulfillment, while simply not making a Relationship Type selection within the specified time, can be inferred as a negative affirmation with the intent of not proceeding any further with fulfillment.

Explicit affirmations can occur with Peer provided or via PRRF system generated means or both. For example, the Source Peer can pose certain Challenge questions to the Target Peer, to which the Target Peer must provide Responses. The nature of the Challenge/Response could be such that these are shared secrets between the Source and Target Peer and unknown to any third parties. For example in an office setting, the Source Peer and Target Peer may have had some private conversation in an office corridor related to a sports event, the details of which are only known to the two of them and could be put to use as a shared secret for a challenge/response. Utilizing a shared secret that has been directly shared by the Source Peer with the Target Peer in person, also overcomes any issues with the Target Peer's account being compromised and a hacker posing as the Target Peer. An impostor would be unable to provide the correct Response to a Challenge during the affirmation step.

In some embodiments, the PRRF system could also generate secret Challenge and Responses and communicate those to the Peers involved in a relationship and require that the Peers carryout the affirmation in person using the secret to eliminate any hacking concerns. In an aspect the secret could be such that the affirmation could occur in public view and not arouse any suspicion. For example if a Source Peer Y is seeking system-based affirmation from a Target Peer X, the PRRF system could generate the secret for Peer X to execute of the form "Peer X wear a red top with blue bottom and ask the Peer Y yesterday afternoon's temperature on Jan. 26, 2016, between 2 and 4 pm" and notify Peer Y to expect this behavior from Peer X as the method of affirmation. As illustrated by this example, the PRRF system generated a multi-factor secret made up of clothing type, common interaction phrase like the weather and the interaction time of the affirmation. If Peer X was also seeking PRRF system generated affirmation from Peer Y, then a secret affirmation execution request would be generated for Peer Y, with Peer X also being similarly notified of the execution details.

In some aspects, affirmations can occur via a plurality of electronic means. These include, but are not limited to, email, phone calls, various Internet based textual or video chat applications, social networking platforms, directly entering affirmations into the system. In other embodiments affirmations could also occur via a plurality of non-electronic means. These include, but are not limited to, face to face in-person interactions, regular postal service mail, courier services. In other embodiments the affirmation could be designed to occur in public without arousing suspicion. Affirmations with in-person interactions or where the affirmation secret was shared in-person, carry the added benefit of eliminating the risk of interacting with hacked accounts.

R120 in FIG. 7 also depicts that for each Relationship request the Source Peer X must provide the Fulfillment period. The Fulfillment period is the time interval(s) that the Source Peer is interested in the request being fulfillable. The time intervals may be contiguous or non-contiguous as explained earlier while discussing the example timeline in FIG. 3. Some embodiments may keep the Fulfillment period as optional and when left unspecified would keep the request as being fulfillable from the point of definition. Once the relationship request has been submitted, Peer X exits the PR module W120 and the stop step R200 is reached. While the discussion above in relation to FIG. 7 has focused on Peer X's interaction with the PR module W120 as depicted via R50, R100, R110, R120 and R200, it is important to recognize that at some point Peer Y may also carry out the equivalent registration and relationship request submission activities via the PR module W120.

Figure 8:
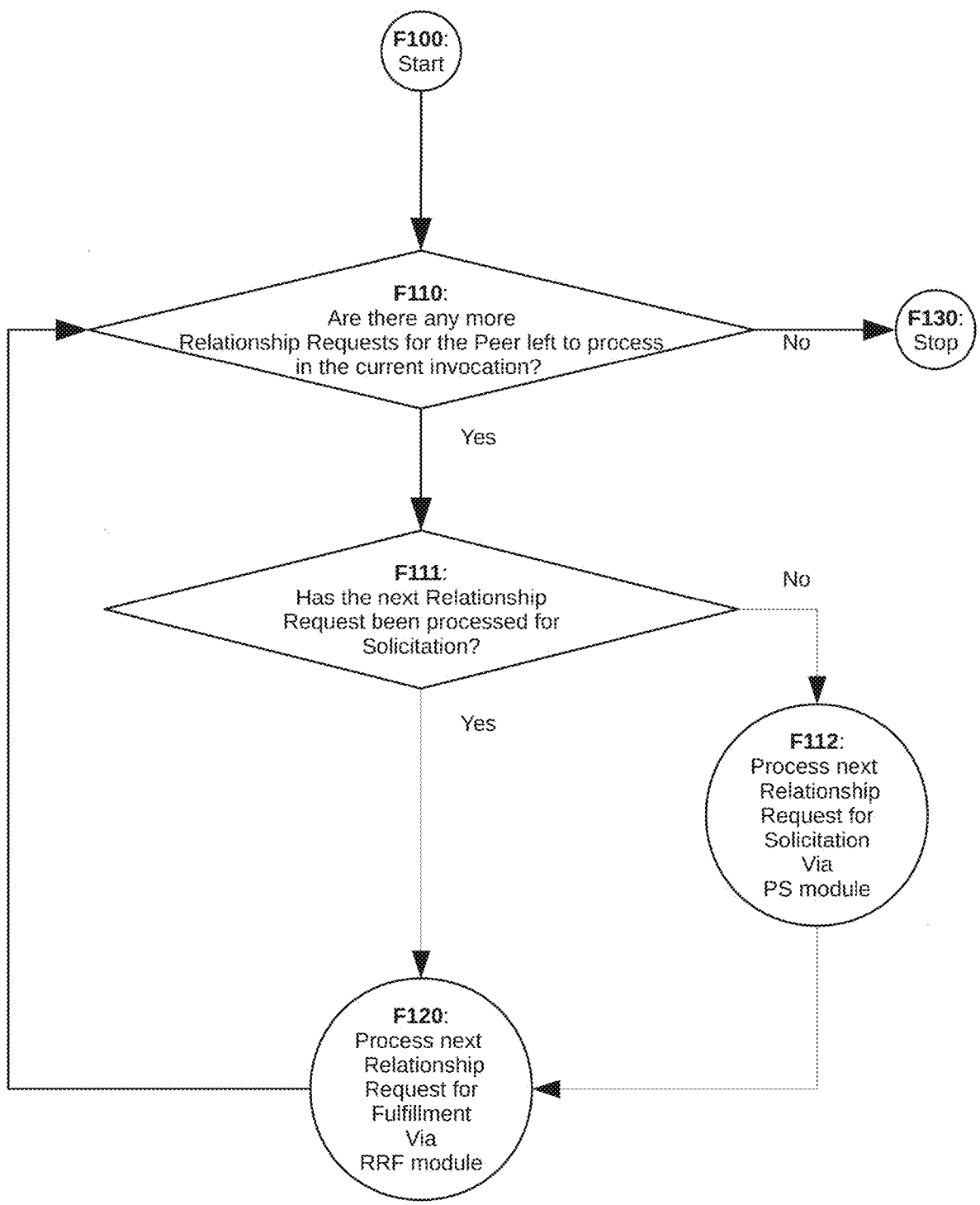
FIG. 8 illustrates a flow diagram depicting processing of relationship requests for a Peer according to an aspect of the present invention.

The Relationship requests submitted by Peers are processed by the PRRF system for fulfillment. FIG. 8 illustrates a method performed by the Master Relationship Requests Fulfillment Module (MRRF module) W130 of the overall system according to an aspect. The MRRF module W130 carries out a Peer's Relationship requests fulfillment processing. As mentioned earlier when covering the overall PRRF system's functional perspective in FIG. 6, the MRRF module W130 in FIG. 6 invokes functionality provided by the PS module W140 in FIG. 6 and RRF module W150 in FIG. 6 for its processing. In some aspects, the PRRF system may elect to invoke the MRRF module W130 at some configured frequency such as hourly, daily etc. as well as based on event triggers such as new registrations, new relationship request submissions, identity authentications, etc. The process is started at F100 by initiating the MRRF module W130. The MRRF module W130 checks for any unprocessed Relationship requests (step F110). If there are unprocessed Relationship requests that haven't already been processed in the current invocation of the MRRF module W130, then the first of the unprocessed Relationship requests is checked to see if it has been processed for any solicitation opportunities to enroll new Peers (step F111). If it has not, then it processed for such opportunities by delegating to the Peer Solicitation Module (PS module W140) (step F112) (discussed in more detail below in relation to FIG. 9).

After the checking for solicitation (step F111) and any solicitation processing (step F112), the relationship request is processed for fulfillment by delegating to the RRF Module W150 (step F120), discussed in more detail below in relation to FIG. 10. After processing the Relationship request for fulfillment, a check is again made to see if there are any more unprocessed request(s) left (step F110). Steps F110, F111, F120 and as necessary F112, keep executing until there are no more requests left to process with a 'No' answer causing the processing to stop at (step F130).

Figure 9:
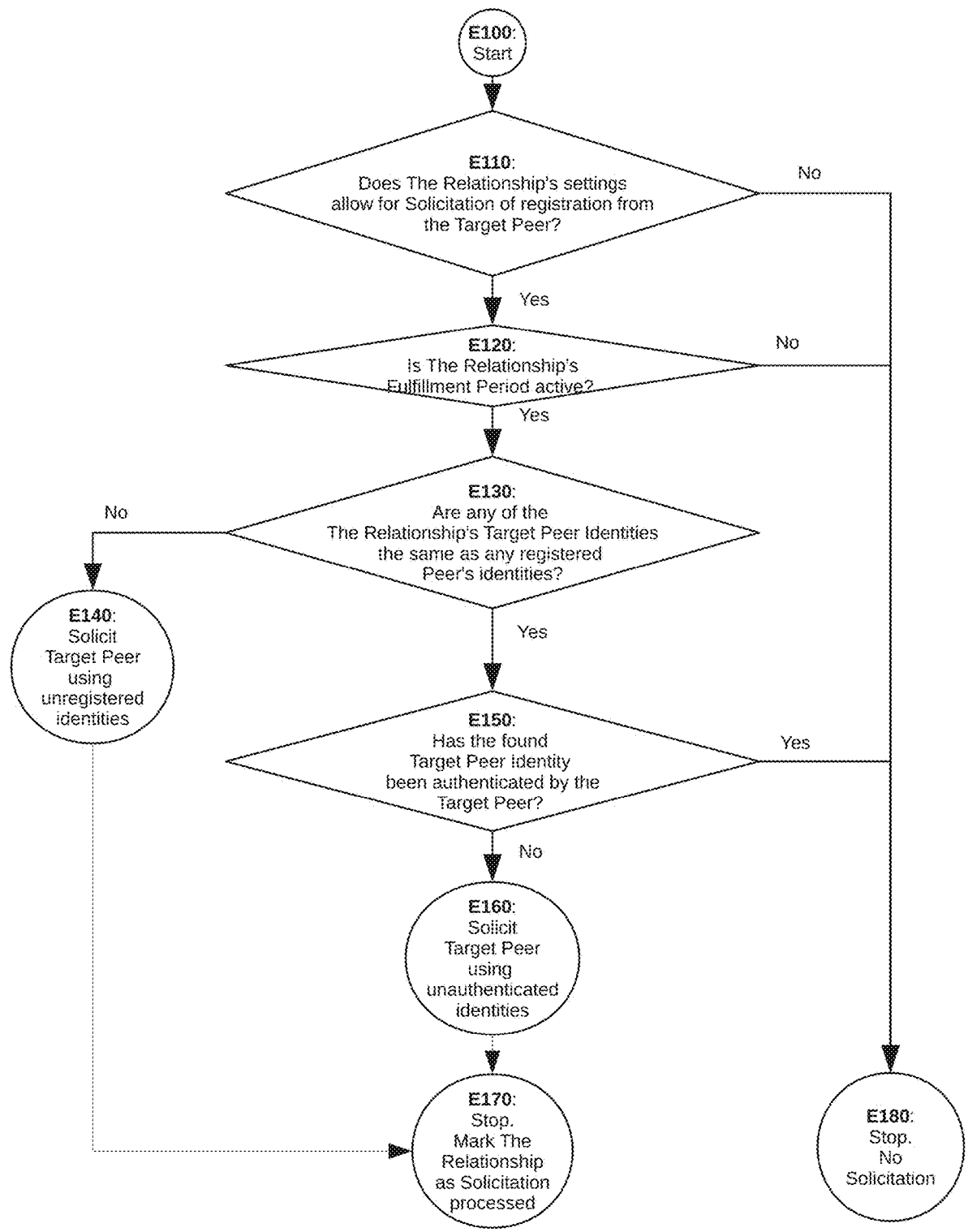
FIG. 9 illustrates a flow diagram depicting the details of the Solicitation processing of a Relationship Request according to an aspect of the present invention.

FIG. 9 depicts the PS module W140 of the PRRF system, illustrating the details of the solicitation processing mentioned earlier (see Step F112 of FIG. 8). Solicitation processing commences from Step E100 in FIG. 9. Step E110 checks if the relationship request's settings allow for solicitation to take place. As discussed earlier, while covering relationship request setup in Step R120 of FIG. 7, a Peer can setup the Relationship request to not allow solicitation. Such Peers may have the intent of ensuring that the Target Peer registers with the PRRF system or authenticates any unauthenticated identity, completely of their volition, rather than be prompted by the PS module W140 in response to the Source Peer's relationship request. Note that other embodiments of the PRRF system may allow further fine tuning of solicitations behavior by permitting solicitations for unregistered entities separately from permitting solicitations for unauthenticated identities. If no solicitations are allowed per the relationship request's settings in Step E110, then the processing stops (Step E180). If solicitations are acceptable per the relationship request's settings, then at Step E120 the relationship's fulfillment period is verified to see if it's still active. If the period is not currently active, the processing stops at Step E180. Note that in other embodiments, even if the fulfillment period is inactive, the PRRF system may still solicit the Target Peer with some generic message to join the PRRF system, even though after joining the Target Peer would not have an immediately fulfillable relationship request available for them. If the relationship's fulfillment period is active, then a check is made using identities (step E130), to determine if the Target Peer is already registered.

If the Target Peer is not registered, a Solicitation request at Step E140 is made, communicating with the Target Peer using the Source Peer provided identity of the Target Peer, to register with the PRRF system. To prevent any further solicitation attempts the relationship is thereafter marked as having been processed for solicitation and with that the solicitation processing for that relationship request completes (Step E170). If, at Step E130, the registered Target Peer is found, then the PS module W140 checks to see if the Target Peer identity referenced in the relationship request is authenticated (step E150). If it is, then no solicitation is required and solicitation processing stops with Step E180. On the other hand, if the Target Peer identity is found to be unauthenticated during step E150, solicitation communication is made to the Target Peer (step E160), asking them to authenticate their unauthenticated identity. Following Step E160, the relationship request is marked as having been processed for solicitation and the processing is completed, module W150 starts the fulfillment process for a relationship request (Step P100). The RRF module W150 checks (at P110) if the fulfillment period for the Relationship request is currently active. If the request is not currently active, the RRF module W150 stops processing the request (at step P210). If the Relationship request has an active fulfillment period, the RRF module W150, at P120, checks the visibility setting of the relationship request. For requests that are visible to any authenticated Peer, the next step is P130 where the RRF module W150 marks the Relationship as searchable by any Peer and then the process continues to step P165. Functionality to allow any authenticated Peers to search for such Relationship requests with visibility to any authenticated Peer is provided separately via the RRS module W190 (see FIG. 6), discussed in more detail later in the document.

Returning to step P120, if the RRF module W150 determines that the Relationship request's visibility is to Any Authenticated Target Peer, then the RRF module W150 checks to see if there is another registered Peer who has authenticated with any of the Target Peer identities listed in the Relationship request (step P165). If such a Peer is found, then that is the Target Peer (i.e., the 'Yes' path out of decision P165). Based on the Relationship request settings provided by the Source Peer, as well as the Peer level and per Identity level settings provided by the Target Peer, the RRF module W150 then goes on to notify the Target Peer of the presence of a Relationship sought by the Source Peer that is targeting them, as well as the Relationship type being sought and also correspondingly notifies the Source Peer (step P170). In an embodiment, the Source Peer and Target Peer notifications could occur, per the combinations depicted in Table 2 below.

TABLE 2

Relationship Request with Any Authenticated Peer or Authenticated Target Peer Visibility: Source Peer & Target Peer Notifications

| | | Target Peer: Peer Level and Identity Level Settings | | |
|---|---|---|---|---|
| | | Do not accept unsolicited notification | Accept unsolicited notification without Source Peer acknowledgement | Accept unsolicited notification with Source Peer acknowledgement |
| Source Peer: Relationship Request Settings | Target Peer acknowledgement required | [U1] Notify Source: No Target: No | [V1] Notify Source: No Target: No | [W1] Notify Source: Yes Target: Yes |
| | Target Peer acknowledgement not required | [U2] Notify Source: No Target: No | [V2] Notify Source: No Target: Yes | [W2] Notify Source: No Target: Yes | marking the relationship as solicitation processed (Step E170). While as depicted in FIG. 9 only a single solicitation requests is made per Target Peer, it should be realized that in other aspects, multiple solicitations are made and possibly continue to be made till the point of the Target Peer responding to the solicitation request. Yet in other embodiments of the PRRF system, the PS module W140 may offer the Target Peer the ability to prevent and no longer receive solicitation requests from the PRRF system.

Figure 10:
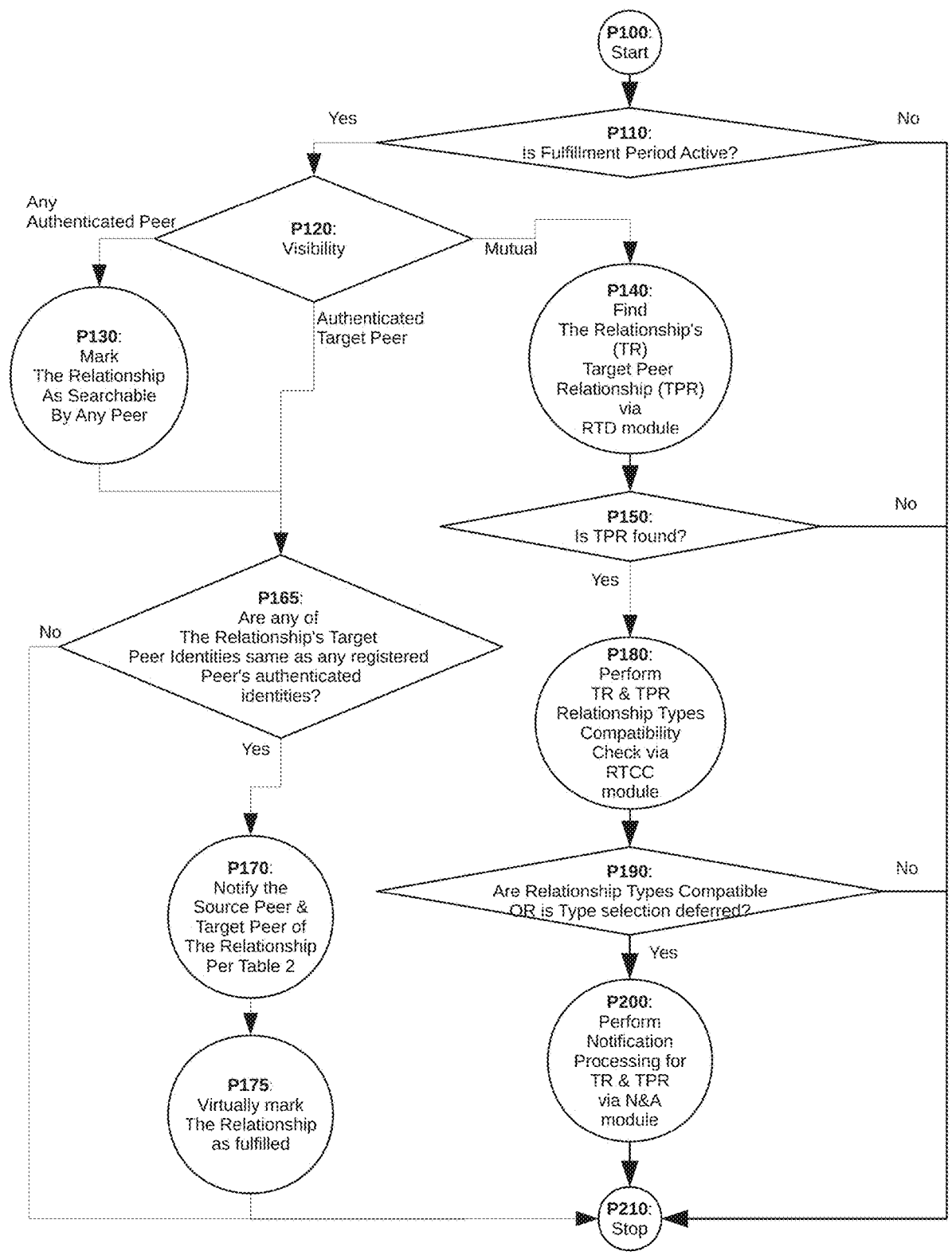
FIG. 10 illustrates a flow diagram depicting the fulfillment processing of a Relationship Request according to an aspect of the present invention.

FIG. 10 depicts a fulfillment process performed by the Relationship Request Fulfillment Module (RRF module) W150 of the PRRF system according to an aspect. As mentioned earlier when covering FIG. 6, the RRF module W150 invokes functionality provided by the RTD module W160, the RTCC module W170, and the N&A module W180 for its processing. Referring to FIG. 10, the RRF Table 2 depicts notification combinations for a Relationship request that has a visibility setting making the request visible to any authenticated Peer or just to the authenticated Target Peer of the request. Additionally, the Source Peer submitting the relationship request can specify whether they seek an acknowledgement of the notification to authenticated Target Peer (such per relationship request settings are depicted via I130 for Peer X's Relationship Request X.2 and I230 for Peer Y's Relationship Request Y.1, in the information architecture schematic of FIG. 1). The Target Peer too can specify whether they are interested in such unsolicited notifications of relationship interests from other Peers and furthermore if they do accept unsolicited notifications, whether the unsolicited notifications delivery is to be acknowledged back to the Source Peer. The Target Peer can specify these settings at a Peer level which would apply to all authenticated identities of the Peer (depicted via I131 for Peer X and I231 for Peer Y, in FIG. 1) and optionally override those at a per Identity level (depicted via I132 for Peer X's email john@cmpny.com identity and I232 for Peer Y's facebook Id of jdoe in FIG. 1). Each combination under the embodiment depicted in Table 2 is described below:

- [U1] and [U2]: The Target Peer is not interested in unsolicited notifications from other Peers. In such cases regardless of the Source Peer's acknowledgement wishes, no notifications occur. In an aspect disabling unsolicited notifications could be utilized by for example, a celebrity, whose identity (e.g., an email address) becomes public knowledge, and may possibly be targeted by their many fans.
- [V1]: The Target Peer accepts unsolicited notifications of interest but does not wish these to be acknowledged back to the Source Peer; the Source Peer relationship request settings seek a mandatory acknowledgement. In this case no notifications occur.
- [V2]: The Target Peer accepts unsolicited notifications of interest but does not wish these to be acknowledged back to the Source Peer; the Source Peer relationship request settings does not require an acknowledgement. In this case the Target Peer is notified of the Source Peer's relationship request details but the Source Peer is sent no acknowledgement notification.
- [W1]: The Target Peer accepts unsolicited notifications of interest and agrees to the delivery of such notifications to be acknowledged back to the Source Peer; the Source Peer relationship request settings seek an acknowledgement. In this case the Target Peer is notified of the Source Peer's relationship request details and the Source Peer is sent an acknowledgement notification of the delivery of the relation request details to the Target Peer.
- [W2]: The Target Peer accepts unsolicited notifications of interest and agrees to the delivery of such notifications to be acknowledged back to the Source Peer; the Source Peer relationship request setting does not seek an acknowledgement. In this case the Target Peer is notified of the Source Peer's relationship request details but the Source Peer is sent no acknowledgement notification.

As discussed thus far, the Source Peer relationship interest notification to the Target Peer outlined in Table 2 implies that the Source Peer identity and full relationship request details are disclosed to the Target Peer. However, it should be understood that a plurality of variations are feasible here, which may correspondingly yield a plurality of embodiments. In one such variation the notification could be anonymous, wherein the identity of the Source Peer remains undisclosed. As another variation, consider the options outlined in Table 2 for constraining notifications to a Target Peer, which implies to encompass all Source Peers. For example, by selecting "Do not accept unsolicited notifications" a Target Peer would not receive any unsolicited notifications from any Source Peers.

However, it is possible for the PRRF system in other aspects to provide more of a continuum, for example by allowing a black list of Source Peers from whom unsolicited notifications are not allowed and/or allowing a white list of Source Peers from whom unsolicited notifications are accepted. In an aspect, the black list or white list may utilize mechanisms to group Peers instead of individually listing Peers. For example, allow a white list of Source Peers that have email Identities from a specific email domain (e.g. all email addresses from mycompany.com) from whom unsolicited notifications are allowed. In other embodiments, differing degrees of the Source Peer's relationship request details that are disclosed to the Target Peer are allowed, ranging from all details to allowing the selection of each part of the relationship request, such as Relationship Type, Relationship fulfillment period and so on. In line with the variations that each embodiments supports, additional Relationship request settings as well as Peer and Identity level settings to address the fulfillment of the variations, from both a Source Peer and Target Peer perspective respectively, would be provided by the embodiment.

In FIG. 10, once the notifications have been sent in accordance with Table 2 (step P170), the next step in the fulfillment processing for such a relationship request is to virtually mark the relationship request as fulfilled (step P175). The term 'virtually marked' here means that the Relationship is internally flagged as fulfilled and not considered in the future for any processing. The process stops at this point (step P210).

If the RRF module W150 determines that the visibility is Mutual (step P120), then the RRF module W150 finds The Relationship request's (TR's) Target Peer Relationship (TPR) (step P140). The method of finding the TPR is functionality provided by RTD module W160, which is discussed in more detail below (see FIG. 11). The RRF module W150 checks if the TPR is found (step P150) and if it is not found, the processing for this request concludes in the current run and stops (step P210). Thus under the Mutual visibility, when there is no TPR found since the Target Peer does not have a reciprocal relationship request for the Source Peer, no notifications occur, the relationship request remains unfulfilled and confidential from the Target Peer and the Source Peer remains unaware of the registration and identity authentication status of the Target Peer. However, if the TPR is found, the RRF module W150 assesses the Relationship type compatibility between the Relationship request and the TPR (step P180). The Relationship type compatibility checking method is functionality provided by RTCC module detailed W170 in FIG. 12. The RRF module W150 can then test if TR and TPR have compatible Relationship type or if the Relationship type selection has been deferred (step P190). If neither condition is true, processing for the Relationship concludes in the current run and stops (step P210). Thus under the Mutual visibility, even when there is a TPR found but the Relationship types between the TR and TPR are incompatible, no notifications occur. Both the TR and TPR relationship requests remain unfulfilled and confidential from their respective Target Peer and the Source Peer of each request remains unaware of the registration and authentication status of that request's Target Peer as well as the existence of a reciprocal request with an incompatible relationship type from the Target Peer. However, if the RRF module W150 finds that either the TR and TPR have a compatible relationship type or if the relationship type selection is deferred (step P190), the notification processing for both the Relationship request and TPR is performed (step P200) by invoking functionality provided by the N&A module W180 and thereafter the process stops (step P210). The details of TR and TPR notifications processing are discussed below in relation to N&A module W180 illustrated by FIG. 13.

Figure 11:
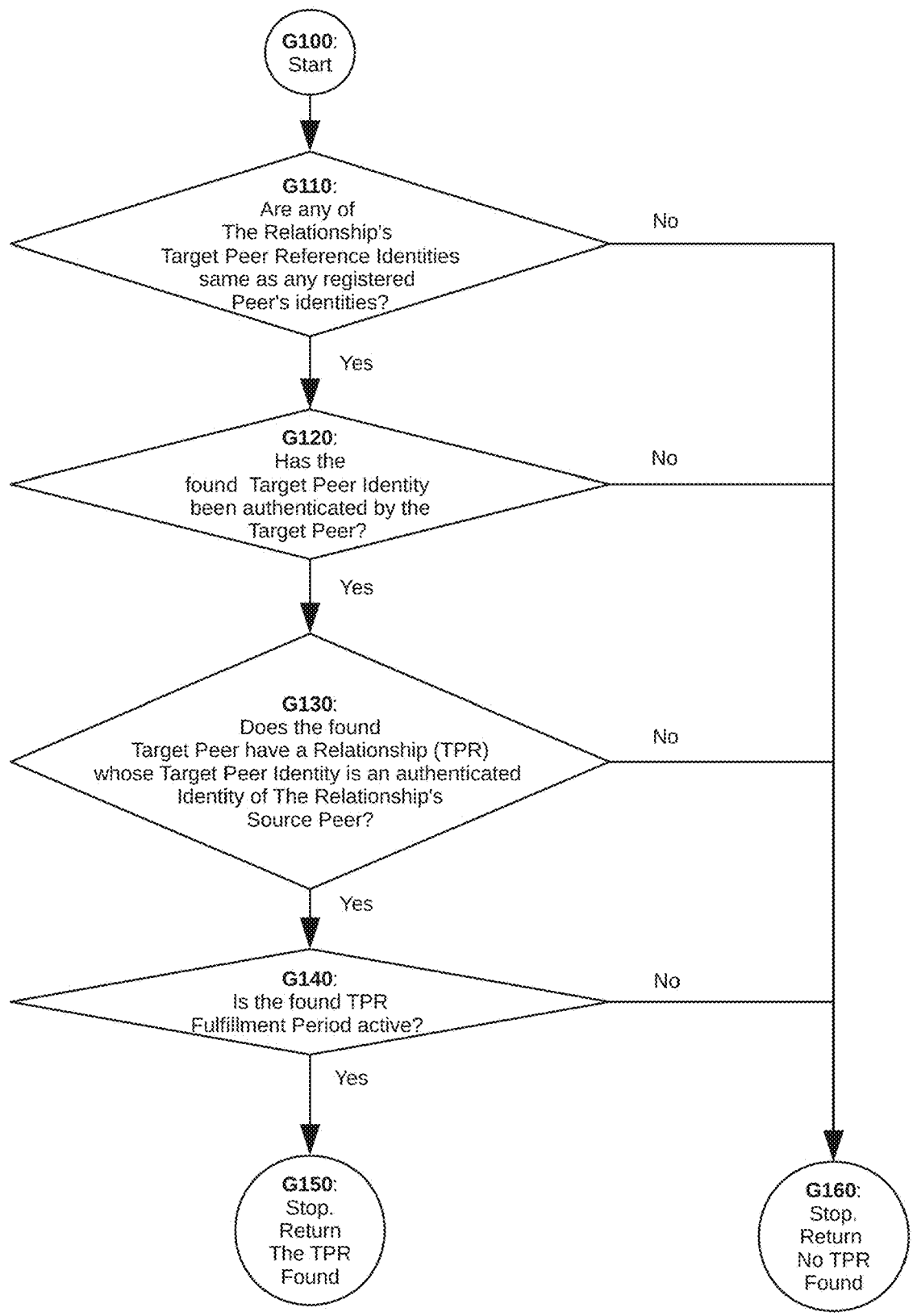
FIG. 11 illustrates a flow diagram depicting the details of finding The Relationship's Target Peer Relationship according to an aspect of the present invention.

FIG. 11 outlines the method of finding a Relationship request's Target Peer Relationship request (TPR), as provided by The Relationship's Target Peer Relationship Determinant Module (RTD module) W160 of the PRRF system. As shown in FIG. 11, the Relationship request being processed is referred to as 'The Relationship request' (TR).

Using the example provided in FIG. 1, if TR being processed was I122, then the RTD module W160 tries to find the TPR I221. The RTD module W160, after initiating the processing (step G100), checks The Relationship request's Target Peer Reference Identities to see if there is any other Peer that has registered with the system with those identities (step G110). If any entity has, then the RTD module W160 identifies that entity as the Target Peer. If the RTD module W160 determines that there are no such entities (step G110), it reports that there is no TPR found (reported as the output of step P140 in FIG. 10 which is subsequently used by step P150 in FIG. 10), and stops the process (step G160).

If a Target Peer is found (step G110), then the next step is to determine that The Relationship request's Target Peer identities, which the Target Peer claims to be theirs, have been authenticated by the Target Peer (G120). In an aspect, it is possible with certain identity types that a Peer may claim ownership to an identity but may not have completed all steps to authenticate that identity. For example, in relation to an email identity, the PRRF system may have sent the Peer an email with some secret and require that the Peer respond back to the PRRF system with that secret. Only the legitimate owner of that email account would be able to read the PRRF system sent email, and be able to respond back to the PRRF system with the secret. It is thus conceivable that while such authentication processes are playing out, the ownership of the identity is not established and the identity not authenticated. If in G120 it is determined that the identity is not authenticated, then the process stops (step G160), and reports that there is no TPR found.

If any of The Relationship request's Target Peer Reference identities is found to have been authenticated by the Target Peer, then the next step G130 is to examine Target Peer's relationship requests and determine if a Target Peer's relationship request's Target Peer Reference identity, is an authenticated identity of The Relationship request's Source Peer, and if it is then that is a valid Target Peer Relationship (TPR) request. Referring back to and using the example depicted in FIG. 1, as The Relationship I122 is processed, its Target Peer Reference identity I160 (Google Id: jane@gmail.com) is an authenticated identity I211 (i.e. the same Google Id: jane@gmail.com) of Target Peer I200. Target Peer I200 in turn has a relationship request I221 which has a Target Peer Reference identity I260 (Facebook Id: johnsmith). This Facebook Id johnsmith is an authenticated identity I111 of Peer I100, with Peer I100 being the Source Peer of The Relationship that is being processed I122. This makes I221 the TPR of I122. In FIG. 11, if no TPR is found at step G130, the RTD module W160 reports that there is no TPR found, and the process stops (G160).

If a TPR is found (step G130), then the RTD module W160 verifies if the Fulfillment period of the TPR is active (step G140). If the Fulfillment period is not active, the RTD module W160 reports that there is no TPR found, and ends (step G160). If the TPR Fulfillment period is active, then the found TPR has met all of the qualifications, and the RTD module W160 will report that the TPR was found and return the TPR (step G150). Note that the found TPR is reported as the output of step P140 in FIG. 10 which is subsequently used by other steps in FIG. 10.

In other aspects, it is possible for the RTD module W160 to find more than one TPR, e.g. when a Peer is allowed to create multiple relationship requests with the same Target Peer. In such cases all TPRs would be found and returned. In an aspect, the TPRs may then be processed via a plurality of approaches such as Peer specified order of precedence for each request directed at the same Target Peer, Relation Type precedence, no precedence and simply process and fulfill all requests, etc.

Figure 12:
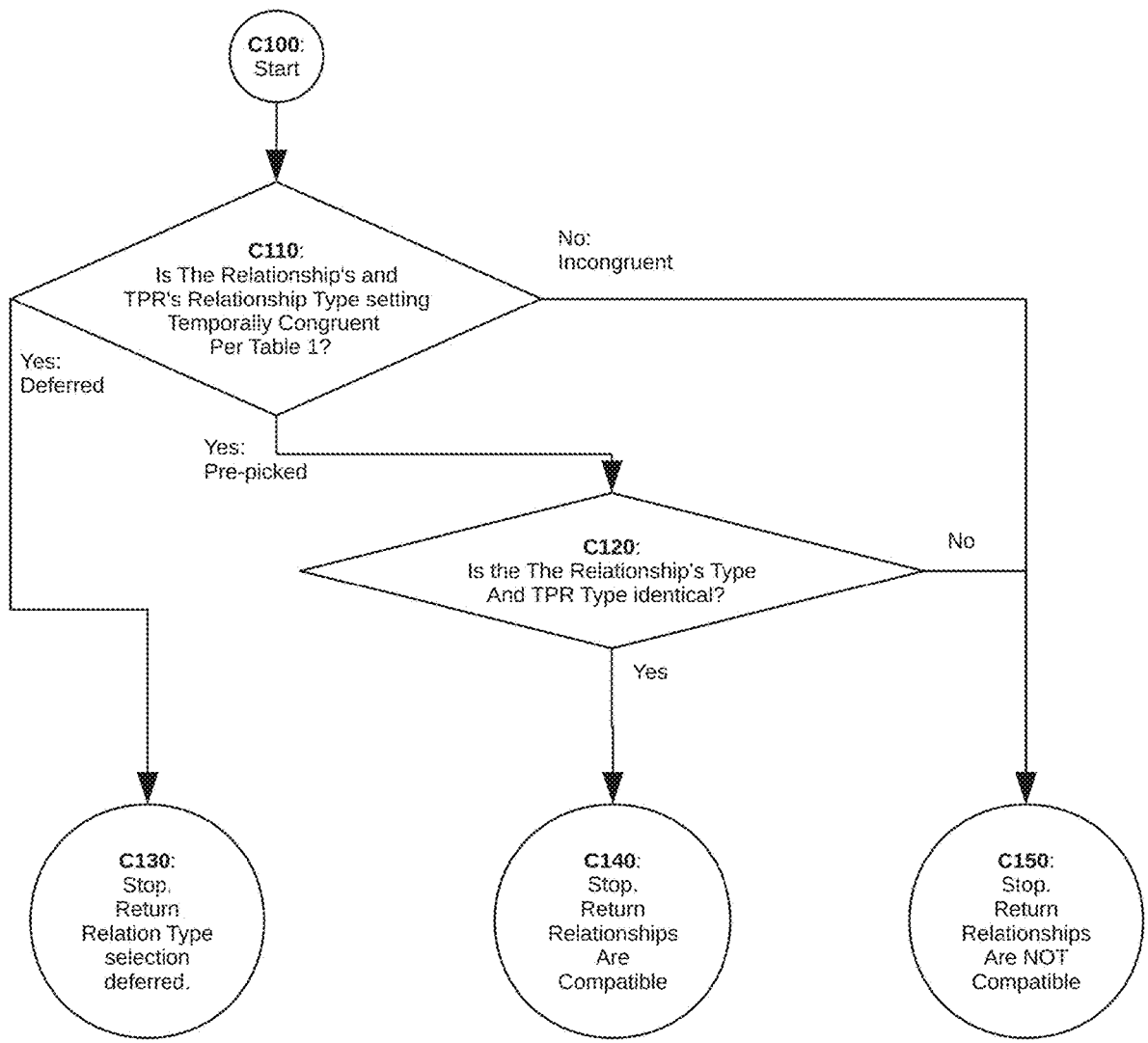
FIG. 12 illustrates a flow diagram depicting the details of Relationship Type compatibility check between The Relationship and Target Peer Relationship according to an aspect of the present invention.

FIG. 12 illustrates the check for Relation Type compatibility between The Relationship (TR) request being processed and its Target Peer Relationship (TPR) request, as provided by The Relationship and TPR Relationship Type Compatibility Check Module (RTCC module) W170 of the PRRF system. The RTCC module W170 is utilized by the RRF module W150 (see step P180 of FIG. 10) and the output of the RTCC module W170 (see step P190 of FIG. 10). The RTCC module W170 is also utilized by the N&A module W180 (step N210 of FIG. 13). In addition, the output of the RTCC module W170 used in step N220 of FIG. 13. In FIG. 12 the system initiates the RTCC module W170 to perform the relationship type compatibility checking (step C100). In an aspect, the RTCC module W170 uses Table 1 to determine if the Relationship Type for The Relationship is temporally congruent with the Relationship Type for the TPR (step C110). For example, per Table 1, there are three possible outcomes: The first outcome is the Relationship Types are temporally incongruent, in which case the RTCC module W170, reports that The Relationship and TPR are not compatible (step C150).

A second outcome is that the Relationship Types are temporally congruent due to the Relationship Type selection being deferred for either request. In such a case, the RTCC module W170 reports that The Relationship and TPR are compatible with the Relationship Type selection being deferred (step C130). A third outcome is that the Relationship types are temporally congruent with the Relationship Types having been pre-picked. In this case, the RTCC module W170 checks if the pre-picked Relationship Types are compatible (step C120). As discussed earlier, there are several possible Relationship Type compatibility assessments according to an aspect. Step C120 depicts an aspect where the Relationship Types equality is used as the compatibility check. If the Relationship Type of The Relationship request is the same as the Relationship Type of the TPR, then the RTCC module W170 reports that TR and TPR are compatible (step C140). Alternatively, if the Relationship Type of TR request is not the same as the Relationship Type of the TPR request, then the RTCC module W170 reports that TR and TPR are not compatible (step C150). In some instances, while TR and TPR are not compatible, they do remain active for a potential future fulfillment should the Relationship Type settings be changed or new Relationship request be created or both, by either Peer.

Figure 13:
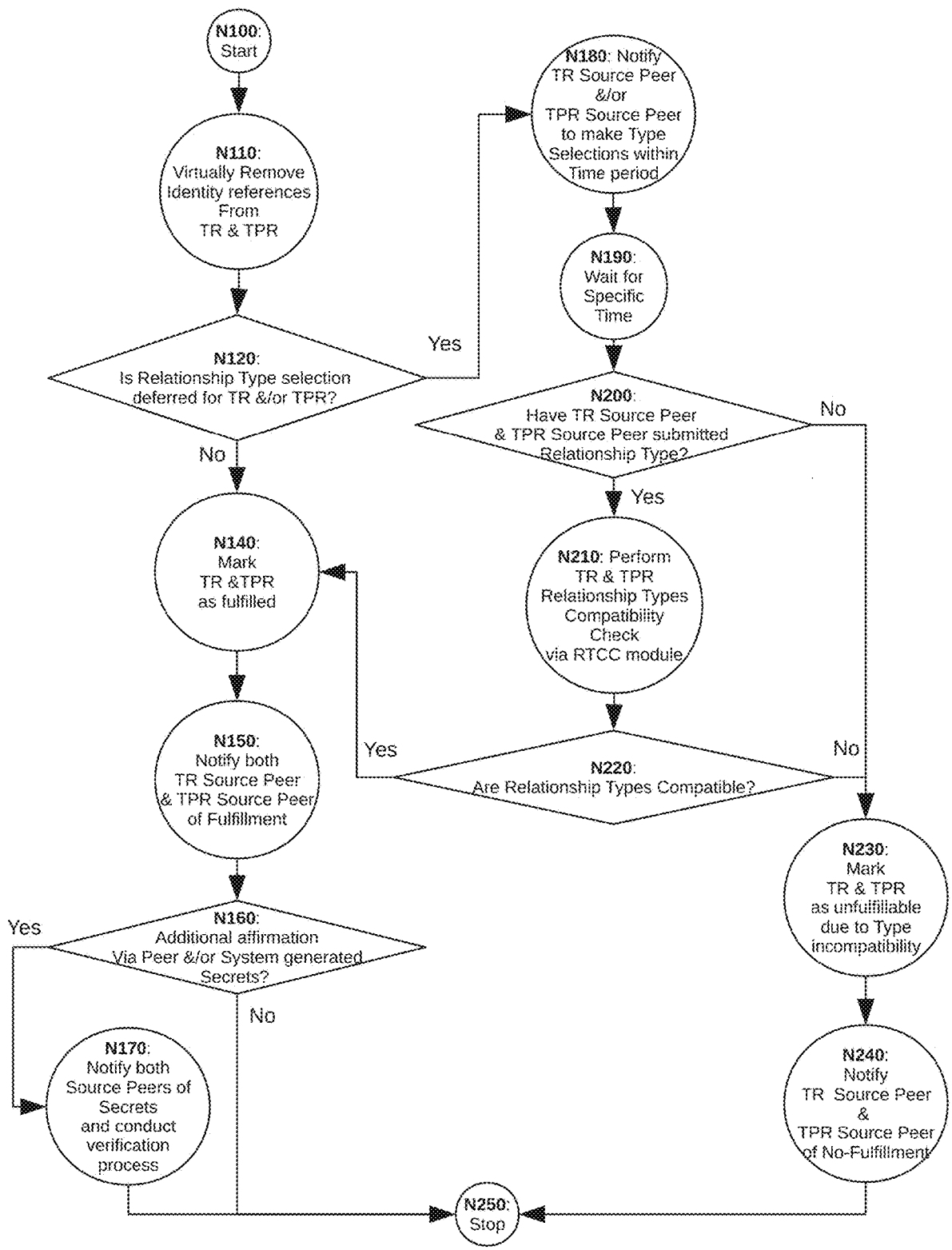
FIG. 13 illustrates a flow diagram depicting details of the Notification and Affirmation processing for The Relationship and Target Peer Relationship Source Peers according to an aspect of the present invention.

FIG. 13 illustrates the notification and affirmations processing for both The Relationship (TR) request that is being processed and its Target Peer Relationship (TPR) request, as provided by the TR and TPR Notifications and Affirmations Module (N&A module) W180 of the PRRF system. The N&A module W180 is utilized by the RRF module W150 in step P200 depicted in FIG. 10. In FIG. 13, the N&A module W180 commences its processing at step N100. Before any notifications are made to the concerned Peers, the N&A module W180 virtually removes all identity references to the Target Peer in both the TR and TPR (step N110). As discussed earlier, this prevents any abuse through the use of PRRF system validated acknowledgement of relationship requests tied to specific identities. In an aspect, some context to the associated Target Peer and the relationship request, such as a Source Peer provided Alias, still remains in both the TR and TPR. The term 'virtually removed' refers to the Relationship request being flagged such that no Target Peer reference identities are shared with the Source Peer from the point of removal. In some aspects, the PRRF system may choose to actually retain the identities, just not make them available to the Peers. In other embodiments, the identities may be physically deleted. Further, in other embodiments, the identities may be encrypted such that only the PRRF system can decrypt them. That is, a plurality of methods may exist to carry out the virtual removal of identities, to achieve the objective of preventing Peers from abusing the PRRF system as a provider of acknowledged relationship requests tied to authenticated identities. Virtually removing the Target Peer identities by flagging and marking them as such and not actually physically deleting them, may allow embodiments to provide additional functionality such as: more complete auditing support; possibly better dispute resolution and addressing of legal concerns; and even allow for viewing of Target Peer reference identities if Target Peer provides their consent.

Referring to FIG. 13, after removing the identities, the N&A module W180 checks if the Relationship type selection is deferred for either TR or the TPR or both (step N120). If it is, then steps N180, N190, N200, N210 and N220 are performed to gather any deferred Relation Type and to then check compatibility. For the TR Source Peer and TPR Source Peer that have a deferred Relation Type selection, the N&A module W180 notifies the Peer to make the Relation Type selection within a specified time period (step N180). The actual notification may occur via a plurality of already authenticated identities such as Email, SMS, Facebook etc.

In one embodiment, Relationship fulfillment processing can commence as soon as all the deferred Relationship Types selections have been made by the concerned Source Peers. While such immediate processing does offer the benefit of faster relationship fulfillment, it introduces the possibility that a Peer may be able to infer lack of interest in them from the Target Peer and thus be open to feelings of rejection. For example, in cases where both TR and TPR Source Peers had selected deferred Relationship Type selection, a Source Peer once notified of the Target Peer's interest may decide to no longer pursue the relationship with the Target Peer by not responding to the request to select a Relationship type. In this case, the Source Peer who immediately responds to the Relationship Type selection but thereafter does not see any follow on notifications soon (steps N150 or N240), would be able to infer lack of interest from the Target Peer. To eliminate such inference capability and lessen the feeling of rejection, the embodiment depicted in FIG. 13 adds step N190 which requires that after the notification (step N180), there will be a fixed wait period before the provided Relationship Type responses are assessed for compatibility and Peers be made aware of this processing delay. Thus, Peers responding early to the Relationship Type selection would still have to wait for follow on processing due to the introduced delay. In an aspect, in a similar manner, a no-response to a Relationship type selection notification for a deferred Relationship setting, would be treated as if the TR and TPR requests had incompatible Relationship Types.

Referring back to FIG. 13, the N&A module W180 verifies if both TR and TPR Source Peers have responded with a Relationship Type (step N200). If both Peers have not, then the TR and TPR requests are treated as incompatible and the N&A module W180, marks both relationship requests as being unfulfillable due to Relationship Types being incompatible (step N230). The N&A module W180 then notifies both Peers of the inability to fulfill the Relationship requests (step N240) before stopping (step N250). Some embodiments may further suggest in such notification to the Peers, given both Peer's overall interest in each other, of the possibility of a fulfillable Relationship via a new Relationship request with different Relationship Type selections than their current unfulfillable Relationship request (step N240). On the other hand, if both TR and TPR Source Peers have responded with a Relationship Type (step N200), then the N&A module W180 performs the Relationship Type compatibility check by invoking functionality that is provided by the RTCC module W170 (step N210). If the Relationship Types are incompatible, then both TR and TPR are marked as unfulfillable due to relationship type incompatibility (step N230) and both the Source and Target Peers notified to this effect (step N240) before stopping (step N250). If the Relationship Types are compatible (step N220), then the TR and TPR are marked as being fulfilled (step N140).

If the N&A module W180 of the PRRF system determines that the Relationship Types for TR and TPR were pre-picked, i.e. neither the TR nor TPR had a deferred Relationship Type selection (step N120), step N140 is also reached. The N&A module W180, for pre-picked Relationship Types, has the pre-condition that both Relationship types be compatible. Step N140 marks both TR and TPR as being fulfilled. Thereafter, the N&A module W180 notifies both the TR and TPR Source Peers of the successful fulfillment of their respective Relationship request (step N150). Note that in general, various methods of notification can be performed by the PRRF system. In an embodiment the notification could occur via a direct communication with details such as the relationship request fulfillment from the PRRF system to an authenticated identifier like an email address, text message to a mobile phone number, or Facebook Id. In another embodiment of the PRRF system, the message sent to the authenticated identifier would only inform the Peer of a status change in their relation request and would instruct the Peer to log back into the PRRF system to determine the exact update.

At step N160, the N&A module W180 checks if any of the TR and TPR have requested further affirmations using either Peer provided or System generated secrets or both, and, if none have been requested, stops (step N250). If affirmations have been requested, then the notifications for the affirmation and the verification process are conducted at step N170 by the N&A module W180, and then ending the process (step N250).

Figure 14:
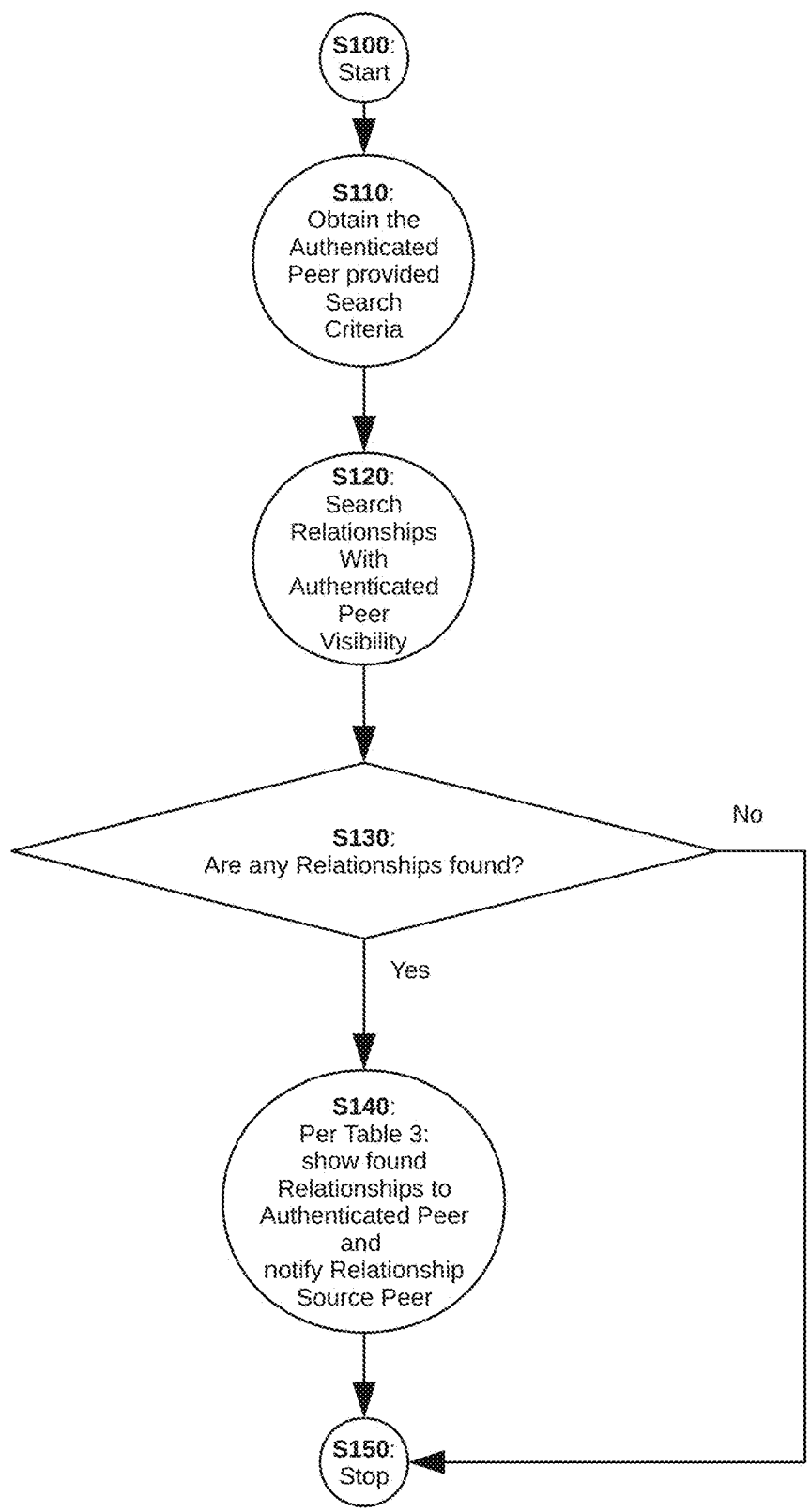
FIG. 14 illustrates a flow diagram depicting details of an Authenticated Peer search for Relationship requests with Authenticated Peer visibility according to an aspect of the present invention.

Referring back to step P130 (see FIG. 10), the RRF module W150 marks those Relationships with Authenticated Peer visibility to be Searchable by any Peer. FIG. 14 depicts The Relationship Requests Search Module (RRS module) W190 of the PRRF system that provides this Search functionality. In an aspect, the PRRF system can call upon the RRS module W190 to begin the process in response to a relationship search request by a Peer (step S100). At step S110, the RRS module W190 gathers any Search Criteria the Peer may have provided. The Search Criteria may include a plurality of facets of the Relationship request such as, but not limited to, Relationship Type and associated attributes, Source Peer Identities, Target Peer Identities, Fulfillment period etc. These facets can be bound together via various logical and comparative search predicates that the Peer specifies via the Search user interface presented by the RRS module W190 to the Peer. The Search criteria selection may also include a Search algorithm selection from a plurality of those provided, including, but not limited to, exact search, fuzzy match, random selection, weighted search, and the like. At step S120, the RRS module W190 would then actually conduct the search based on the selections from step S110 or configured values. At step S130, the RRS module W190 checks to see if any Relationship requests were found. If none are found, then the RRS module W190 stops the process (step S150). If the RRS module W190 finds Relationship requests meeting the Search terms (step S130), then those are disclosed and shown to the Authenticated Peer with the Source Peer of the relationship request notified in accordance with Table 3 at step S140, and thereafter process stops (step S150).

TABLE 3

Relationship Request with Any Authenticated Peer Visibility: Relationship Request disclosure to Authenticated Peer and Source Peer Acknowledgement Notifications

| | | Authenticated Peer Search Settings: Peer Level and Authenticated Identity Level Settings | | |
|---|---|---|---|---|
| | | Do not send any acknowledgement to Source Peer | Send anonymous acknowledgement to Source Peer | Send traceable acknowledgement to Source Peer |
| Source Peer: Relationship Request Settings | Traceable Authenticated Peer acknowledgement required | [L1] Source Peer: No-notify Auth. Peer: No-show | [M1] Source Peer: No-notify Auth. Peer: No-show | [N1] Source Peer: Identity-notify Auth. Peer: Show |
| | Anonymous Authenticated Peer acknowledgement required | [L2] Source Peer: No-notify Auth. Peer: No-show | [M2] Source Peer: Anonymous-notify Auth. Peer: Show | [N2] Source Peer: Anonymous-notify Auth. Peer: Show |
| | No Authenticated Peer acknowledgement required | [L3] Source Peer: No-notify Auth. Peer: Show | [M3] Source Peer: No-notify Auth. Peer: Show | [N3] Source Peer: No-notify Auth. Peer: Show |

In an aspect, for a Relationship request with Any Authenticated Peer Visibility, Table 3 depicts Relationship request settings setup by a Source Peer as well as Peer level and/or Identity level settings for an Authenticated Peer, and the impact of such combinations on the Relationship request being disclosed to the Authenticated Peer searching for relationship requests with said visibility and the corresponding acknowledgement notification, if any, being sent to the Source Peer of the Relationship request. Each combination under the embodiment depicted in Table 3 is described below:

[L1]: The Authenticated Peer's Peer Level and/or authenticated Identity Level setting for all identities does not allow sending any acknowledgement to a Source Peer of relationship requests with Authenticated Peer visibility. The Source Peer of the relationship request seeks traceable Authenticated Peer acknowledgement whenever the Authenticated Peer searches for the relationship request. In this case due to the misalignment of the acknowledgement settings, the Relationship request is not shown to the Authenticated Peer and correspondingly the Source Peer is not sent any acknowledgement notification.

[M1]: The Authenticated Peer's Peer Level or at least one authenticated Identity Level setting allows for sending anonymous acknowledgement to a Source Peer of relationship requests with Authenticated Peer visibility. The Source Peer of the relationship request seeks traceable Authenticated Peer acknowledgement whenever the Authenticated Peer searches for the relationship request. In this case, due to the misalignment in the acknowledgement settings, the Relationship request is not shown to the Authenticated Peer and correspondingly the Source Peer is not sent any acknowledgement notification.

[N1]: The Authenticated Peer's Peer Level or at least one authenticated Identity Level setting allows for sending traceable acknowledgement to a Source Peer of relationship requests with Authenticated Peer visibility. The Source Peer of the relationship request seeks traceable Authenticated Peer acknowledgement whenever the Authenticated Peer searches for the relationship request. In this case the acknowledgement settings align, resulting in the Relationship request being disclosed and shown to the Authenticated Peer and correspondingly the Source Peer is sent an acknowledgement notification with the relevant identities of the Authenticated Peer carrying out the search.

[L2]: The Authenticated Peer's Peer Level and/or authenticated Identity Level setting for all identities does not allow sending any acknowledgement to a Source Peer of relationship requests with Authenticated Peer visibility. The Source Peer of the relationship request seeks anonymous Authenticated Peer acknowledgement whenever the Authenticated Peer searches for the relationship request. In this case due to the misalignment of the acknowledgement settings, the Relationship request is not shown to the Authenticated Peer and correspondingly the Source Peer is not sent any acknowledgement notification.

[M2]: The Authenticated Peer's Peer Level or at least one authenticated Identity Level setting allows for sending anonymous acknowledgement to a Source Peer of relationship requests with Authenticated Peer visibility. The Source Peer of the relationship request seeks anonymous Authenticated Peer acknowledgement whenever the Authenticated Peer searches for the relationship request. In this case the acknowledgement settings align, resulting in the Relationship request being disclosed and shown to the Authenticated Peer and correspondingly the Source Peer is sent an acknowledgement notification with the anonymity of the Authenticated Peer carrying out the search preserved.

[N2]: The Authenticated Peer's Peer Level or at least one authenticated Identity Level setting allows for sending traceable acknowledgement to a Source Peer of relationship requests with Authenticated Peer visibility. The Source Peer of the relationship request seeks anonymous Authenticated Peer acknowledgement whenever the Authenticated Peer searches for the relationship request. In this case the acknowledgement settings align, resulting in the Relationship request being disclosed and shown to the Authenticated Peer and correspondingly the Source Peer is sent an acknowledgement notification with the anonymity of the Authenticated Peer carrying out the search preserved.

[L3]: The Authenticated Peer's Peer Level and/or authenticated Identity Level setting for all identities does not allow sending any acknowledgement to a Source Peer of relationship requests with Authenticated Peer visibility. The Source Peer of the relationship request does not seek Authenticated Peer acknowledgement whenever the Authenticated Peer searches for the relationship request. In this case the acknowledgement settings align, resulting in the Relationship request being disclosed and shown to the Authenticated Peer. However, correspondingly the Source Peer is not sent any acknowledgement notification.

[M3]: The Authenticated Peer's Peer Level or at least one authenticated Identity Level setting allows for sending anonymous acknowledgement to a Source Peer of relationship requests with Authenticated Peer visibility. The Source Peer of the relationship request does not seek Authenticated Peer acknowledgement whenever the Authenticated Peer searches for the relationship request. In this case the acknowledgement settings align, resulting in the Relationship request being disclosed and shown to the Authenticated Peer. However, correspondingly the Source Peer is not sent any acknowledgement notification.

[N3]: The Authenticated Peer's Peer Level or at least one authenticated Identity Level setting allows for sending traceable acknowledgement to a Source Peer of relationship requests with Authenticated Peer visibility. The Source Peer of the relationship request does not seek Authenticated Peer acknowledgement whenever the Authenticated Peer searches for the relationship request. In this case the acknowledgement settings align, resulting in the Relationship request being disclosed and shown to the Authenticated Peer. However, correspondingly the Source Peer is not sent any acknowledgement notification.

While discussing the search of relationship requests with authenticated peer visibility as depicted in FIG. 14, only registered and authenticated Peers were allowed to search for relationship requests. However, it should be realized that other embodiments are possible too, which may relax the Peer registration and authentication constraint and even allow guests, i.e. un-registered and thus unauthenticated Peers, to search and view such relationship requests.

As a part of the overall relationship request fulfillment processing, there may be some Peers who are interested in being notified if any of their owned Identities was used in relationship requests. If the relationship request's visibility is Authenticated Target Peer and the Peer is a Target Peer then the Peer would already be notified as depicted at step P170 (see FIG. 10). In an aspect, if the relationship request's visibility is Any Authenticated Peer, the PRRF system can provide a per Identity level configuration setting or a Peer registration level configuration setting or both, to allow the Peer to be notified during the course of relationship request fulfillment processing if their Identity is the Target Peer in the relationship request. In an aspect, if the relationship request's visibility is Mutual, the Peer cannot be automatically notified of the other Peer's interest without the level of reciprocity depicted in FIG. 10 and discussed earlier. However, embodiments may additionally have a Relationship request setting which the Source Peer can set, to allow the Target Peer to be notified of an interest in them, without disclosing the identity of the Source Peer. In an aspect under this anonymous notification, whether any details of the relationship sought are, or are not, disclosed could be another configurable item. Such behavior in an aspect could also be made configurable by each Peer where they participate as a Target in a relationship request. In aspect, the Peer could configure at the Peer level, or on a by specific owned identities basis, that they do, or do not, wish to be notified of interests where the Source Peer identity is not to be disclosed. In an aspect, such configuration could be carried out during initial Registration as depicted via FIG. 7 or post-registration as discussed under Peer and Relationship management later in the document and depicted via FIG. 15.

Figure 15:
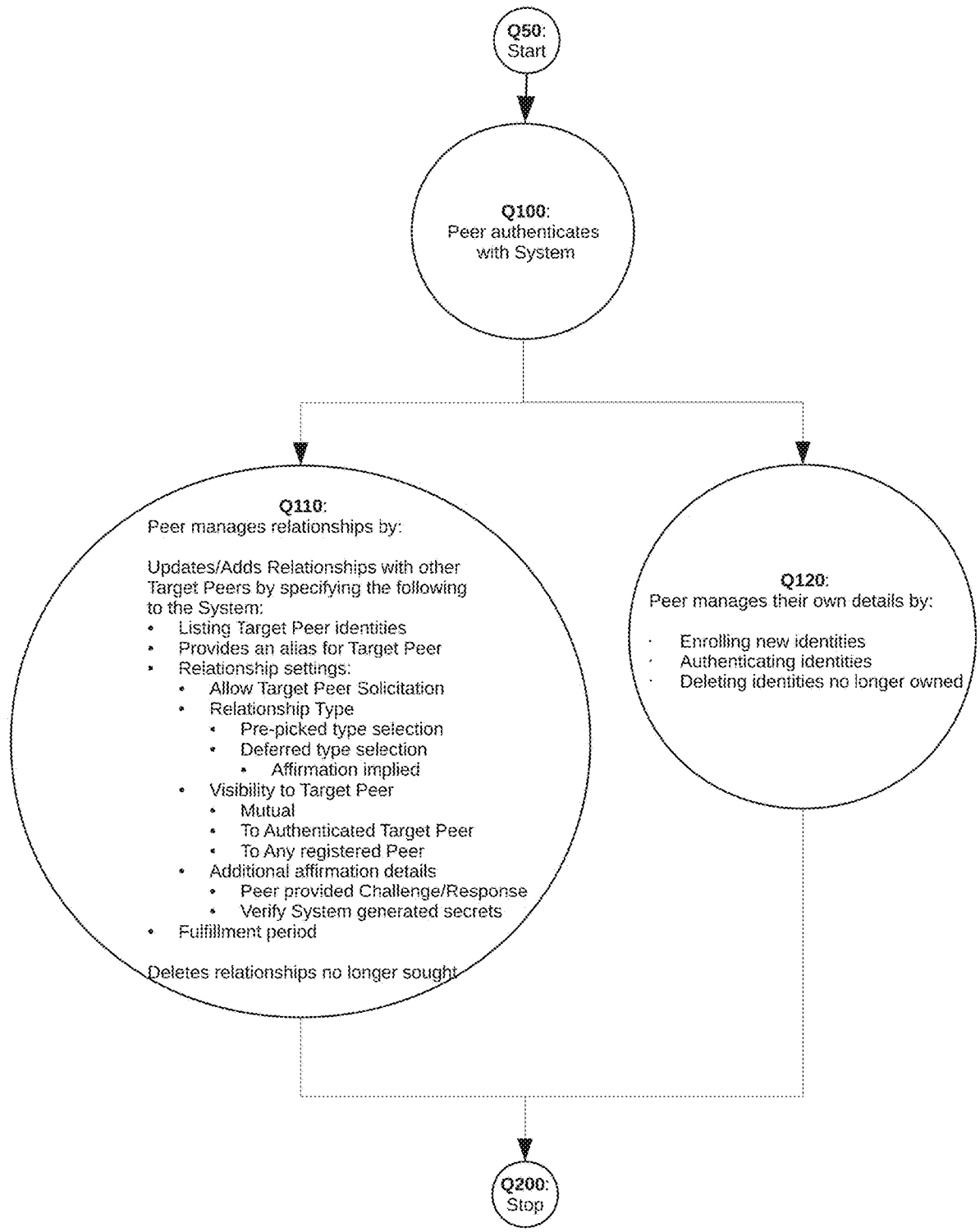
FIG. 15 illustrates a flow diagram depicting a Peer managing their own details as well as their relationships of interest according to an aspect of the present invention.

Peers may use the PRRF system over an extended period of time. During that course of time, Peers details, such as their owned identities, may change. Peers may also seek new relationships, may wish to update existing ones with details such as new identities of Target Peers, and may no longer wish to pursue earlier sought relationships. FIG. 15 illustrates a method carried out by the Peer and Relationship Management Module (PRM module) W199 of the PRRF system, which provides the functionality to manage Peer details and relationship requests. The PRM module W199 commences at step Q50 in FIG. 15. At Step Q100, the Peer authenticates with the PRRF system using one of their registered identities, in order to be able to access the PRRF system to make any updates. Thereafter, in Step Q110 the Peer can make updates to any existing relationships, including deleting the relationship request altogether. Alternatively, after authentication the Peer may perform Step Q120 and update their own details, such as enrolling any new identities, authenticating any unauthenticated identities, deleting no longer owned identities. Steps Q110 and Q120 are not mutually exclusive and can be performed as per the Peer's needs following which the Peer can exit PRM module W199 with which the stop step Q200 is reached.

Figure 16:
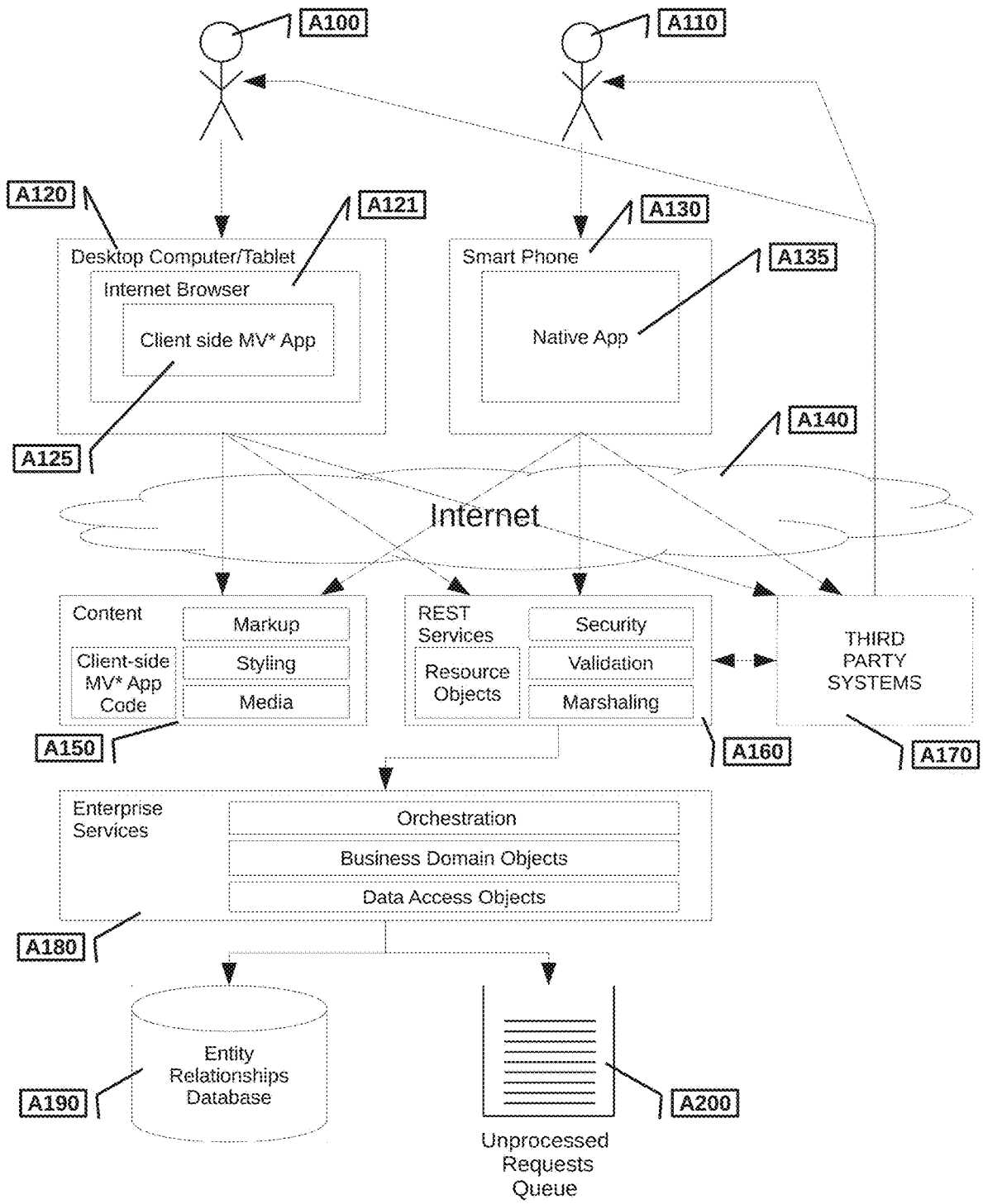
FIG. 16 illustrates a block diagram of the registration system architecture of the peer registration and relationship fulfillment system according to an aspect of the present invention.

FIG. 16 illustrates the architecture of the Registration Systems as a contemporary n-tier architecture with well-defined roles and responsibility of each tier with clear separation of concerns between them. The system components of FIG. 16 are involved with the registration and relationship request submission. A Peer A100 using a Desktop Computer A120 or some device with an Internet browser such as a Tablet would register with the PRRF system via an application A125 that would mainly run in the Internet browser A121 of the A100 Peer's A120 device. In an aspect, a Desktop computer or device such as a tablet A120 can run the browser A121 and within the browser runs the Client side MV* Application A125. A Client side MV* App A125 is an application written using a category of application development frameworks that follow the Model-View-Controller or Model-View-View-Model or Model-View-Presentation design patterns, collectively referred to as MV* frameworks. MV* frameworks and applications built using these frameworks that run in the browser A121, such as Google's Chrome browser, Microsoft's Internet Explorer or Edge browser, Apple's Safari browser or Mozilla foundation's Firefox browser are typically written in the Javascript programming language, a language which is natively supported by the afore mentioned contemporary browsers. Two contemporary examples of such Client side MV* frameworks are AngularJS and EmberJS. The Peer accesses the Client side MV* App A125 by typing in the Universal Resource Locator (URL) of the application web page in the address bar of their browser A121. The browser A121 then connects to the Registration system web site via the Internet A140 and fetches the web page content from the application's content sub-system A150. The content includes the Hyper Text Markup Language (HTML) markup, style sheets, any images or other media and the execution code for the Client-side MV* application A125. The browser A121 renders the markup, applies the styles, loads the media and executes the Client-side MV* App code, providing the Peer with an interactive user interface with which to register.

The Client-side MV* App A125 receives and sends registration data to backend servers via the Internet A140 by invoking Representational State Transfer (REST) Services A160. The Client-side MV* App A125 also interacts with various Third Party systems A170 for certain functionality such as identity authentication, e.g. interact with Facebook for identity authentication using the OAuth protocol. REST Services tier A160 has functionality to address concerns around security of the communication with the Client-side MV* App A125; validating the data received from the Client-side MV* App A125; invoking the Enterprise Services A180; and as it does so mapping and marshaling the data from Business Domain Objects view provided by Enterprise Services to Resource Objects view provided by REST Services A160.

The fundamental business logic and rules of the registration and the request processing system is the responsibility of the Enterprise Services tier A180. In an aspect, the Enterprise Services tier A180 is partitioned into Business Domain Objects which model the various constituents of the PRRF system, such as Peers, Relationship Requests etc. The Business Domain Objects also contain the business logic associated with each such constituent. Any cross Business Domain Objects logic is located in the orchestration components which provide more coarse grained functionality. Business Domain Objects utilize the Data Access Objects to store and retrieve their state from a database A190 which houses the Entities and Relationships and their associated details. Any requests that require further processing are placed by the Enterprise Services tier A180 in the Unprocessed Requests Queue A200, to be worked upon by the Processing System (the same Unprocessed Requests Queue is also depicted as B200 in FIG. 17 which illustrates the Processing System Architecture).

In an aspect, smart phones, such as the Apple iPhone and various Android smart phones, have mobile apps that provide a more native and integrated experience to the user. Tablets and other devices running flavors of these mobile operating systems are also capable of running native applications. Therefore, Peers A110 can utilize a smart phone A130 for registration, with a native application A135 written specifically for each mobile platform. The native application A135 would typically be made available to the Peers via each platforms app store, e.g. iTunes for the Apple/IOS platform, Google Play for Android platform, etc. The native app A135 while providing the platforms native look and feel, would still communicate via the internet A140 with Third parties and the Registration system's Content tier A150 for any content such as media etc. as well as utilize REST Services A160 for accessing registration resources. The intent being to allow for the common functionality to be easily leveraged by both Client-side MV* apps A125 running in the browser and Native apps A135 running on the smart phone. It should also be noted that Client-side MV* apps A125 and native apps A135 are not absolutes and that a continuum exists between the two with hybrid apps embodiments, wherein the native app provides a shell that hosts a browser component within it, and the latter then runs the Client-side MV* app A125. Furthermore, it should be noted that there are no inherent limitations on the type of application that can be built and utilized on a specific device type. That is, while FIG. 16 depicts an embodiment where Client-side MV* app A125 is running in a browser A121 on a Desktop Computer or Tablet A120 and a native app A135 on a Smart Phone A130, in other embodiments, a native application could be built and utilized on a Desktop Computer or Tablet and a Client-side MV* app run in a browser on a Smart Phone.

Figure 17:
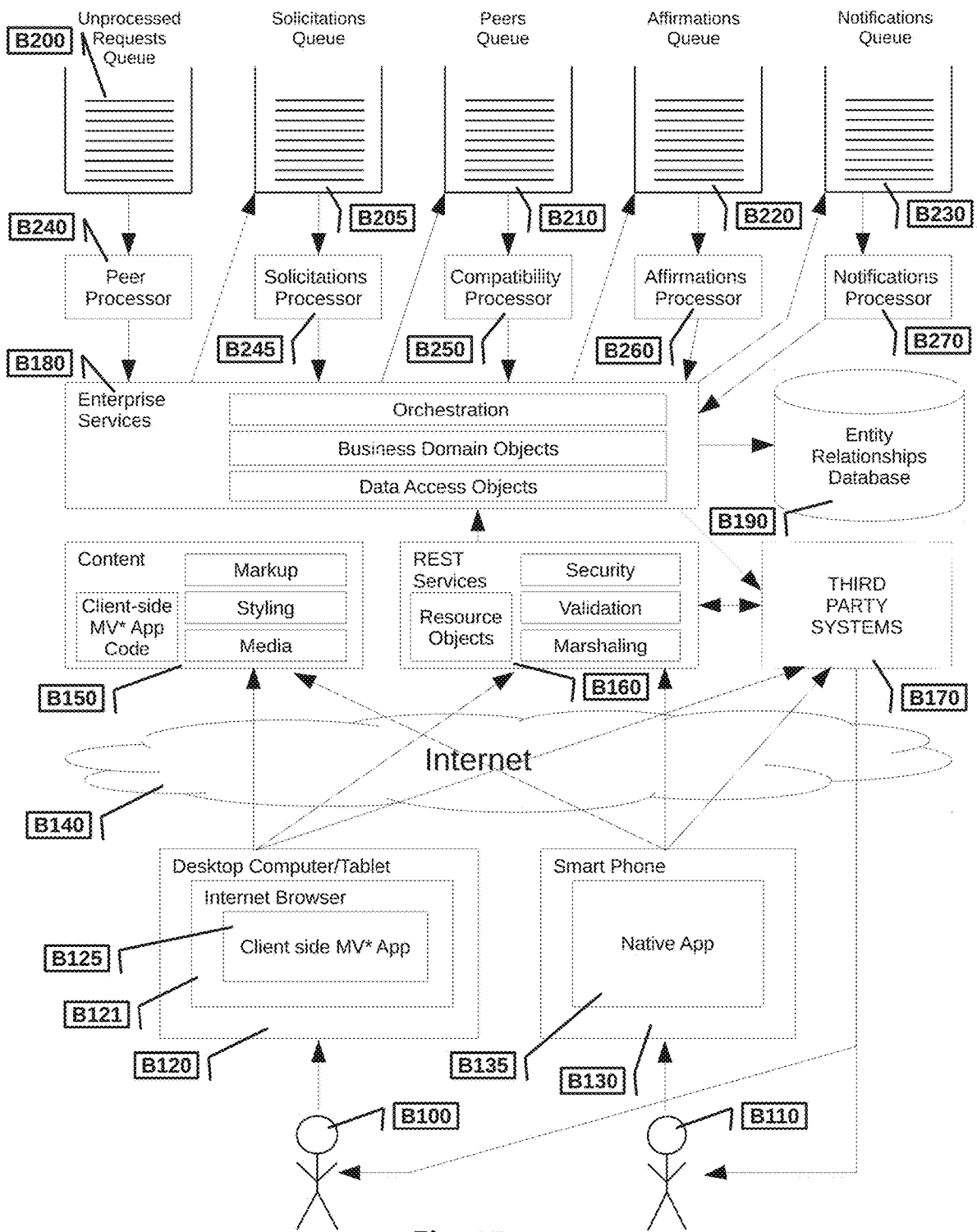
FIG. 17 illustrates a block diagram of the processing system architecture of the peer registration and relationship fulfillment system according to an aspect of the present invention.

Once the Peer has registered and submitted any relationship requests via the Registration System, the fulfillment and subsequent processing of the relationship requests occurs via the Processing System. As illustrated in FIG. 17, a queuing based solution is outlined, wherein messages are placed in queues B200, B205, B210, B220, B230 and then processed by relevant Processors B240, B245, B250, B260, B270 listening for the arrival of messages in their respective queues. Such architecture scales well, allowing the opportunity to increase the number of processing units of a particular type should the number of messages in a queue cross any thresholds that would impact desired levels of service to Peers. Note that the Processors B240, B245, B250, B260, B270 are relatively void of any business logic and instead have a well-defined and limited responsibility of retrieving messages off a queue and invoking the relevant Enterprise Services B180 to carry-out the processing. This provides for a clear separations of concerns between the functionality provided by the Processors and the Enterprise Services, allowing for a more maintainable and extensible system.

The Enterprise Services B180 are stateless and as a part of their processing either store the state in the Entity Relationships database B190 or one of the queues like B200, B205, B210, B220 and B230. By not maintaining state, the Enterprise Services consume less resources and can be scaled up easily should the number of requests needing to be processed increase than if the Enterprise Services were stateful. Similar to the Processors B240, B245, B250, B260, B270, the Enterprise Services B180 too can be scaled independently and by service type, to meet any service level agreements or goals.

In an aspect, the unprocessed relationship requests are placed in the Unprocessed Requests queue B200. The Peer Processor B240 processes the messages in B200 by invoking the relevant services in the Enterprise Services tier B180. Depending on the particulars of the relationship request and business functionality involved, the Enterprise Services B180 so invoked, may use Third Party systems B170 to communicate with the Peer or it may place the request in one of the other queues B205, B210, B220, B230 for further processing or it may update the database B190 as appropriate. In an aspect, if the Enterprise Service B180 determines that a Target Peer was found, it could place a message in the Peers queue B210 such that compatibility processing can occur on the Request. In another an aspect, if the Enterprise Service B180 determines that the Target Peer is currently not registered and needs to be solicited, it could place a message in the Solicitations queue B205 to initiate the solicitation processing; and so on.

Any messages placed in the Solicitations queue B205 are handled by the Solicitations Processor B245, which in turn utilizes the Enterprise Services B180, to actually perform the various functions required for soliciting a Peer. Messages from the Peers queue B210 are processed by the Compatibility Processor B250 which like other processors utilizes the appropriate Enterprise Services B180 to perform the relationship requests compatibility assessments. In an aspect, an affirmation queue B220 can hold messages that are processed by the Affirmations Processor B260 by invoking relevant Enterprise Services B180 to carryout affirmation processing functionality. Likewise, the notifications queue B230 holds messages that are processed by the Notifications Processor B270 which again utilizes the concerned Enterprise Services B180 to carry out the notification processing functionality. That is, basically a set of queues and processors are utilized to carry out the relationship request processing workflow with processors invoking Enterprise Services B180 for execution of business functionality. Processing of relationship requests also requires interaction with the Peers for which the architecture remains the same as outlined in FIG. 16. Thus in FIG. 17 the architecture components B100 through B200 are the same as those found in FIG. 16 A100 through A200, e.g. both A125 and B125 are the Client-side MV* App running on a Desktop computer or Tablet devices Internet browser. The actual business functionality though would differ between registration and request processing. For example, Client-side MV* App A125 would be used to provide registration information to the system in FIG. 16, while in FIG. 17 for B125 Client-side MV* App would address other processing related functionality such as providing inputs for deferred relationship type selections, affirmation processing etc.

Figure 18:
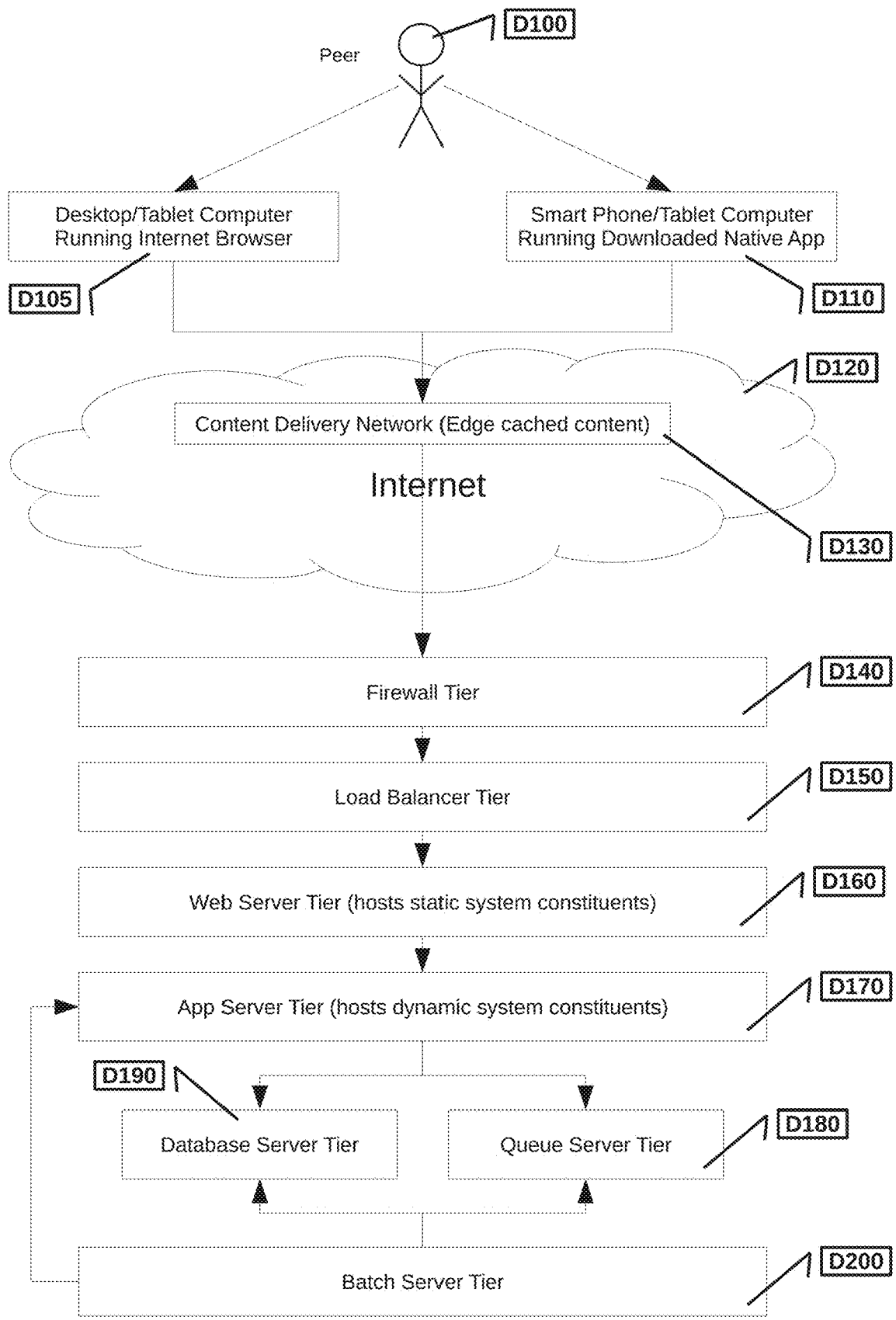
FIG. 18 illustrates a block diagram of the deployment architecture of the peer registration and relationship fulfillment system according to an aspect of the present invention.

FIG. 18 illustrates an embodiment of the Deployment Architecture of the overall n-tier system. The Peer D100 accesses the PRRF system via the Internet D120 on some computing device, either by loading the application web page on some computing device running a browser D105 or by a mobile app downloaded from an appropriate app store D110. The Peer's request to access the system reaches an Internet connected data center that hosts the PRRF system's multiple deployment tiers. Each deployment tier has a specific responsibility and is composed of multiple redundant computing devices such that the failure of one or more servers does not lead to an overall system outage. In certain embodiments it is even possible for each tier to span multiple physical data center locations, such that an entire data center outage can be tolerated without the overall system being subject to an outage. The Firewall tier D140 is responsible for ensuring that only legitimate requests to the PRRF system are permitted to pass through, while other requests, malicious or otherwise, are filtered out. All other deployment tiers are behind the Firewall. The Load Balancer tier D150 is responsible for balancing out the load among the computing devices of Web Server D160 and App Server D170 tiers. By balancing the load, optimum performance is obtained from each computing device in the tier, as well as from the tier as a whole. Contemporary web servers such as the Apache Web server make up the Web Server tier D160. The web servers D160 host static constituents of the system typically made up of the elements that are sent to the browser or mobile application for processing and execution. Content as depicted by B150 in FIG. 17 being mainly static, is deployed on the Web Server tier D160. The dynamic constituents of the PRRF system which involve processing on the backend servers are deployed on App Server tier D170. The App Server tier is made up of contemporary Application Servers such as RedHat JBoss Application Server, IBM Websphere Application server, Oracle Weblogic Application Server etc. The dynamic parts of the system are then deployed inside of such Application servers. System elements B160, B180, B240, B245, B250, B260, B270 in FIG. 17 are deployed and executed in the App Server tier D170. D190 Database Server tier runs a contemporary Relational Database management system such as Oracle RDBMS or IBM DB2. System element B190 in FIG. 17 would be deployed in D190. D180 represents a contemporary messaging system such as IBM MQ Series, RedHat JBoss Active MQ, etc. The various queuing elements B200, B205, B210, B220, B230 from FIG. 17 can be deployed in D180. System elements B240, B245, B250, B260 and B270 in FIG. 17 may be deployed directly in the App Server tier D170 or in an embodiment could also be hosted via a separate Batch processing Tier D200. D200 tier carries out processing on multiple records by directly accessing the Database tier D190, Queuing tier D180 and invoking Enterprise Service deployed in D170. Also inevitably with a system of this proportion and scale, there is additional maintenance work required for processing data feeds from various sources, as well as handling unplanned situations, e.g. messages stuck in queues, errors during service execution etc. Such batch processing and ad hoc system components would be deployed on D200.

It should be realized that the Peer could be located anywhere in the world and thus possibly quite far in network terms, with several network node hops, from where the system computing devices D140 through D200 are located. To provide the Peer with a responsive experience, especially during initial application startup, regardless of the degree of network separation, static constituents of the system are cached at several edge nodes D130 of the Internet. Third Party Content Delivery Networks (CDN) with network points of presence in several geographical regions, provide such content caching capability. As mentioned, content is deployed on the Web Server tier D160. However, as the content flows through from D160 through the Internet and the CDN, it is cached at the edge by the CDN. Thus any subsequent requests for the static constituents are served up by the edge nodes of the CDN D130 and do not need to flow through to D160. The CDN provides various means to clear the edge cached content such that the Peer does not receive stale static content, such as manually triggering a cache clear, time based cached clearing, etc.

Note that the above discussion around the system architecture is focused on the core invention itself. Other more broader embodiments may include other features such as an End user self-help sub-system, Customer Care sub-system, Billing sub-system, etc. Also, while describing the invention two Peers, namely, a Peer X and a Peer Y have been used, however, it is to be understood that system embodiments can scale from handling hundreds of thousands of Peers, through to all of humanity.

Having thus described exemplary embodiments of the PRRF system, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A computer-implemented method of establishing relationships online, the method comprising:
   a. registering a first peer, wherein the first peer provides at least one first peer identity when registering;
   b. receiving a first relationship request from the first peer, wherein the first relationship request seeks a relationship between the first peer and a second peer, wherein the first peer selects the second peer by identifying the second peer with at least one second peer identity associated with the second peer;
   c. registering the second peer, wherein the second peer provides at least one second peer identity when registering;
   d. receiving a second relationship request from the second peer, wherein the second relationship request seeks a relationship between the first peer and the second peer, wherein the second peer selects the first peer by identifying the first peer with at least one of the at least one first peer identity;
   e. detecting that both the first peer and the second peer have submitted the first and second relationship requests that seek to fulfill relationships with each other, wherein the first relationship request is not visible to the second peer and the second relationship request is not visible to the first peer until both the first and second relationship requests are detected to be fulfilled;
   f. fulfilling the relationship requests between the first and second peers; and
   g. notifying both the first peer and the second peer of the fulfillment of the first relationship and the second relationship, wherein the second relationship request can be submitted before, simultaneously, or after the first relationship request.

2. The method of claim 1, wherein registering the first peer and the second peer requires both the at least one first peer identity and the at least one second peer identity to be authenticated identities.

3. The method of claim 1, wherein each of the first and second relationship requests identifies a source peer and a target peer, wherein the source peer and the target peer of the first relationship request is the first peer and the second peer respectively and the source peer and the target peer of the second relationship request is the second peer and the first peer respectively.

4. The method of claim 3, wherein either the first relationship request or the second relationship request is submitted without requiring that the target peer is registered.

5. The method of claim 4, wherein when the target peer is not registered, soliciting the target peer to register using at least one target peer reference identities specified in the first relationship request or the second relationship request to communicate with the target peer.

6. The method of claim 3, wherein the target peer can select to view notifications of unsolicited relationship requests without disclosing the identity of the source peers.

7. The method of claim of claim 6, wherein the target peer can select to view notifications of unsolicited relationship requests without sending acknowledgement of viewing such a notification back to the source peer.

8. The method of claim 3, wherein the source peer can update any pending unfulfilled relationship requests with additional target peer identities.

9. The method of claim 3, wherein the first relationship request and the second relationship request include target peer reference identities.

10. The method of claim 9, wherein the target peer reference identities are hidden upon proceeding with fulfillment.

11. The method of claim 9, wherein the target peer reference identities are displayed to the target peer upon proceeding with fulfillment.

12. The method of claim 9, wherein when the target peer has not authenticated at least one of the target peer reference identities specified in the first relationship request or the second relationship request, soliciting the target peer to authenticate the at least one target peer reference identity using the at least one target peer reference identity to communicate with the target peer.

13. The method of claim 3, further comprising identifying the target peer of the first relationship request or the second relationship request using target peer reference identities specified in the first relationship request or the second relationship request created by the source peer and the target peer authenticated identities.

14. The method of claim 3, wherein the first and the second relationship requests comprise a plurality of relationship types, wherein fulfilling the relationship requests between the first and second peers further comprises fulfilling the relationship requests when the relationship types of the first and second relationships are consistent with each other.

15. The method of claim 14, wherein the fulfilling the relationship requests further comprises determining relationship compatibility.

16. The method of claim 15, wherein determining relationship compatibility assessing relationship type values against one another and allowing the relationship fulfillment if the relationship type values of each are compatible with one another.

17. The method of claim 15, wherein determining relationship compatibility comprises assessing attributes of the requests for compatibility.

18. The method of claim 14, wherein the selection of a relationship type can be deferred by the source peer until the detection of a reciprocal relationship request from the target peer.

19. The method of claim 3, wherein the first relationship request or the second relationship request from the source peer further comprises requirements for further affirmations from the target peer for relationship fulfillment, wherein the target peer is required to perform the further affirmations before the fulfilling of the relationships can be completed.

20. The method of claim 19, wherein the further affirmations comprise challenge question(s) which the target peer must respond to with valid responses.

21. The method of claim 3, wherein when a plurality of relationship requests are received for the target peer, allowing the target peer to search and view the plurality of relationship requests.

22. The method of claim 21, wherein the source peer is notified when the target peer views one of the plurality of relationship requests from the source peer.

23. The method of claim 3, wherein the source peer and target peer have compatible interest in unsolicited relationship requests, wherein unsolicited relationship request notifications can be viewed by the target peer.

24. The method of claim 23, wherein finding compatible interest in unsolicited relationship requests, further comprising compatibility of notification acknowledgement.

25. The method of claim 1, wherein the first relationship request and the second relationship request include a relationship type.

26. The method of claim 25, wherein the relationship type denotes a kind of relationship that the first peer and the second peer are seeking.

27. The method of claim 26, wherein the relationship type comprises a plurality of relationship types.

28. The method of claim 25, wherein the first peer and the second peer define the relationship type.

29. The method of claim 1, wherein the first relationship request and the second relationship request include a relationship fulfillment period.

30. The method of claim 1, wherein when the at least one second peer identity provided by the first peer has not yet been be authenticated, soliciting the second peer to authenticate the at least one second peer identity using the at least one second peer identity to communicate with the second peer.

31. The method of claim 1, wherein when the first relationship request from the first peer comprises the first peer seeking a relationship between the first peer and a plurality of other peers;
the detecting step further comprises finding relationship requests from a first portion of the plurality of other peers that include relationship requests that seek to fulfill a relationship with the first peer;
the fulfilling step further comprises fulfilling relationship requests between the first peer and a second portion of the first portion of the plurality of other peers having compatible requests; and
the notifying step further comprises notifying the first peer and the portion of the plurality of other peers and second peers of the fulfilled relationship requests.

32. A system for peer registration and relationship fulfillment, the system comprising:
a server, wherein the server is configured to communicate with user devices and third party servers, the server comprising:
a processor;
memory, wherein the memory comprises:
a peer registration module configured to register peers associated with the user devices and receive relationship requests from the peers;
a master relationship request fulfillment module configured to process the relationship requests from the peers and to keep relationship requests confidential from peers until corresponding requests are received and identified;
a peer solicitation module configured to solicit unregistered peers to register or registered peers to authenticate unauthenticated identities provided;
a relationship request fulfillment module configured to fulfill a relationship request;
a target peer relationship determinant module configured to determine a relationship request's target peer relationship request;
a compatibility check module configured to check compatibility of a relationship and the relationship's target peer relationship request;
a notification and affirmation module configured to notify and perform affirmations with the peers for a relationship request and the relationship's target peer relationship request; and
an authentication module configured to authenticate the peers.

* * * * *